United States Patent
Lee et al.

(10) Patent No.: US 6,228,969 B1
(45) Date of Patent: May 8, 2001

(54) BIODEGRADABLE POLYESTER URETHANES, METHOD FOR THE PRODUCTION AND USE THEREOF

(75) Inventors: Yoon Jick Lee, Blaustein; Hartmut Seliger, Elchingen-Thalfingen; Erwin Happ, Neu-Ulm, all of (DE)

(73) Assignee: Elbe Technologies Ltd., Seoul (KR)

( * ) Notice: Subject to any disclaimer, the term of this patent is extended or adjusted under 35 U.S.C. 154(b) by 0 days.

(21) Appl. No.: 09/445,380

(22) PCT Filed: Jun. 6, 1998

(86) PCT No.: PCT/DE98/01539

§ 371 Date: Dec. 6, 1999

§ 102(e) Date: Dec. 6, 1999

(87) PCT Pub. No.: WO98/55527

PCT Pub. Date: Dec. 10, 1998

(30) Foreign Application Priority Data

Jun. 6, 1997 (DE) .............................................. 197 23 895

(51) Int. Cl.⁷ .................................................. C08G 18/42
(52) U.S. Cl. ................. 528/80; 528/59; 528/73; 528/74; 528/75; 528/76; 428/423.1; 428/425.1; 525/457; 525/458; 525/54.31
(58) Field of Search ................................................ 528/80

(56) References Cited

U.S. PATENT DOCUMENTS 5,665,831 * 9/1997 Neuenschwander et al. ....... 525/415

FOREIGN PATENT DOCUMENTS

| | | |
|---|---|---|
| 195 08 627 | 9/1996 | (DE) . |
| 0 696 605 | 2/1996 | (EP) . |
| 0 723 983 | 7/1996 | (EP) . |
| 5-148352 | 6/1993 | (JP) . |
| WO 9601863 | 1/1996 | (WO) . |

* cited by examiner

Primary Examiner—James J. Seidleck
Assistant Examiner—Melanie D. Bagwell
(74) Attorney, Agent, or Firm—Collard & Roe, P.C.

(57) ABSTRACT

The present invention concerns biodegradable linear polyester urethanes as well as biodegradable crosslinked polyester urethanes issuing from the linear polyester urethanes in such a way that they are crosslinked by diisocyanate bridges. By varying the degree of crosslinking it is possible to adjust the physical, chemical and biological properties in the crosslinked polyester urethane as defined by the invention in a targeted manner. In particular, it is possible to vary the rate of biodegradation of said crosslinked polyester urethane because the biological degradation takes place at a slower rate as the degree of crosslinking increases. Furthermore, the object of the invention is a method of producing the polyester urethanes as defined by the invention, as well as its application in the form of sheets or foils, shaped rubber articles, containers, packaging materials, in the field of galenic pharmacy; and in the form of adhesives and adhesive tapes and the like. Furthermore, the invention relates to polymer blends containing the polyester urethanes as defined by the invention.

16 Claims, 9 Drawing Sheets

BIODEGRADABLE POLYESTER URETHANES, METHOD FOR THE PRODUCTION AND USE THEREOF

BACKGROUND OF THE INVENTION

1. The Prior Art

Although plastics are produced in large quantities only since about 1930, they have become indispensable now for modern life. However, the rapidly expanding production and increasing consumption of plastic materials are increasingly posing problems. In the foreground is in particular the pollution of the environment with plastic refuse. Known statistical data show that the component of plastic refuse is alarmingly high: about 18% of the volume of municipal refuse is caused by plastic materials, with about half of that volume being attributed to packaging refuse. The disposal of plastic materials continues to be extremely problematic in this connection, for example because highly toxic dioxins may be formed in the incineration of such materials. In the USA, approximately 96% of the total amount of plastic refuse ends up in garbage dumps, 3% is incinerated, and only about 1% is recycled.

The search for an equivalent substitute material becomes more and more urgent because the demand for plastic materials is constantly growing. There is consequently an extraordinarily high demand for biodegradable materials that offer the advantages of plastics, but are nonetheless biodegradable at the same time.

Attempts have been increasingly made in the last few years to meet these requirements. However, it has been found that the realization is connected with huge problems due to the fact that the required properties are mutually exclusive in most cases.

A possible solution is described in EP 0 696 605 A1, which relates to a biodegradable multi-block polymer, which is prepared by linear polycondensation of two α, ω-dihydroxy polyesters/ethers with diisocyanate, di-acid halide, or phosgene. The α, ω-dihydroxy polyesters are obtained through trans-esterification of poly-(R)-(3)-hydroxy-butyric acid in the form of Biopol®, and are thus degraded by means of an ester interchange catalyst, or catalysts, with degradation of the ester bonds. Biopol ® is commercially available and is obtained in the form of a bacterial product. Other α, ω-dihydroxy polyesters are produced through ring-opening polymerization of cyclic esters or lactones, for example ε-caprolactone with aliphatic diols.

The microstructure of the produced macrodiols results here depending on the monomer distribution, whereby stereospecific structures are produced exclusively.

The macrodiol is produced without or also with a catalyst, whereby $SnO(Bu)_2$ or dibutyl tin laurate is employed at temperatures of from 100° to 160° C.

Also polyurethanes are produced in this connection by reacting the macrodiols with diisocyanate such as, for example 1,6-hexamethylene diisocyanate, whereby the block polymers consisting of macrodiol and diisocyanate, other than with the present invention, always have valerate segments in the final product.

According to EP 0 696 605 A1, the bio-compatible or biodegradable polymers are used as medical implants, for which reason the material has to satisfy high technical requirements.

It is particularly disadvantageous in this connection that both the starting and the final products are stereo-specific, i.e. that only certain configurations are present (e.g., the bacterial product only has the R-configuration). Furthermore, bacterial polymers are, as a rule, very brittle because of their very regular crystal structure, and consequently very fragile. The polymeric products of EP 0 696 605 A1 are slightly softer, however, they still exhibit a brittle property to some extent. Furthermore, the bacterial starting products are relatively expensive. Moreover, said block polymers exhibit different discolorations, i.e. like their bacterial starting products, they are milk-colored, as a rule, which may give them a visually unattractive appearance. Said drawbacks limit the fields of application of the products of EP 0 696 605 A1 at least to some extent.

An attempt is made according to DE 195 08 627 A1 to avoid said drawbacks of the bacterially obtained PHA-material through the synthesis of polyester urethanes built up from diisocyanate and macrodiols, which in turn are produced from alkylene oxides and carbon monoxide. This method particularly has the drawback that the process has to be carried out with toxic and combustible gases under high pressure.

SUMMARY OF THE INVENTION

Therefore, the object of the present invention is to avoid the drawbacks of the prior art and to make available enhanced polymer products, which, like poly-3-hydroxy-butyric acid, are biodegradable. The polymers should have a visually attractive appearance, and their properties should permit them to be usable in many different ways. Furthermore, the goal is to provide a process that is enhanced versus the methods of the prior art, and which, in a simple way, permits the production of said polymers on a large industrial scale at favorable cost, using starting products which are not produced bacterially.

The object is achieved according to the invention by making available biodegradable, linear polyester urethanes, whereby the linear polyester urethanes are structured by units of the general formula (I); i.e. consist of such units.

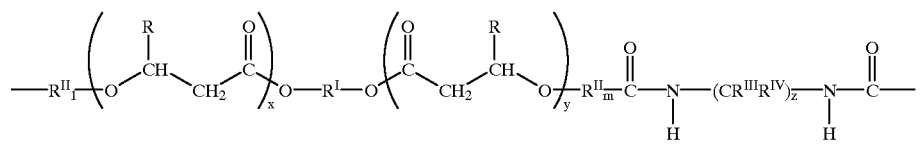

whereby R is an unsubstituted or substituted, saturated or unsaturated ($C_1$–$C_{10}$) hydrocarbon group, preferably methyl, ethyl or propyl, and the substituents are selected from the group consisting of halogen, pseudo-halogen, ($C_1$–$C_{10}$)-alkyl, ($C_1$–$C_{10}$)-alkoxy, allyl, vinyl, benzyl, unsubstituted or substituted aryl such as phenyl or naphthyl, alkenyl, alkinyl, amide, ($C_1$–$C_6$)-dialkylamino, unsubstituted or substituted ($C_3$–$C_8$)-cycloalkyl; and the aryl or cycloalkyl substituents are halogen, pseudo-halogen, ($C_1$–$C_{10}$)-alkyl, ($C_1$–$C_{10}$)-alkoxy, amide, ($C_1$–$C_6$)-dialkylamino, alkenyl, alkinyl, allyl and/or vinyl;

$R^I$ is selected from the group consisting of:

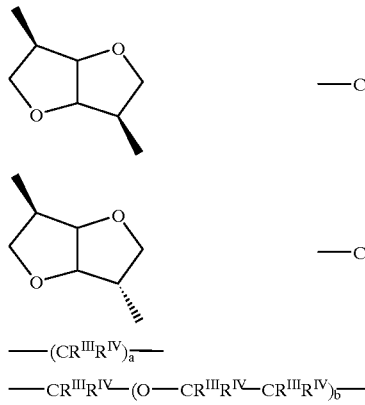

with a=2 to 12, and b=1 to 3000;

$R^{II}$ is a ring opening product of a compound selected from the group consisting of β-propio-lactone, γ-butyro-lactone, δ-valero-lactone, ε-capro-lactone, or N-protected D, L-serine-lactone, which, if need be, may be substituted with a substituent from group A;

$R^{III}$ and $R^{IV}$ are independently of each other the same or different and selected from the group consisting of H, —OR, whereby R is as defined above, halogen, pseudo-halogen, benzyl, allyl, vinyl, unsubstituted or substituted aryl, such as phenyl or naphthyl or the like, ($C_1$–$C_{10}$)-alkyl, alkenyl, alkinyl, amide, ($C_1$–$C_6$)-dialkylamino, unsubstituted or substituted ($C_3$–$C_8$)-cycloalkyl, with at least one hetero-atom, if need be, unsubstituted or substituted five-, six- or seven-link aromatics or hetero-aromatics with at least one hetero-atom, whereby the hetero-atom is O, S or N, and the substituents are taken from group A;

whereby $0 \leq x+y \leq 60$, and $2 \leq 1+m \leq 60$, and z=1 to 25.

Furthermore, the object of the invention are biodegradable cross-linked polyester urethanes ensuing from the linear polyester urethanes with units of formula (I) because they are cross-linked by diisocyanate bridges and contain fragments of the general formula (II):

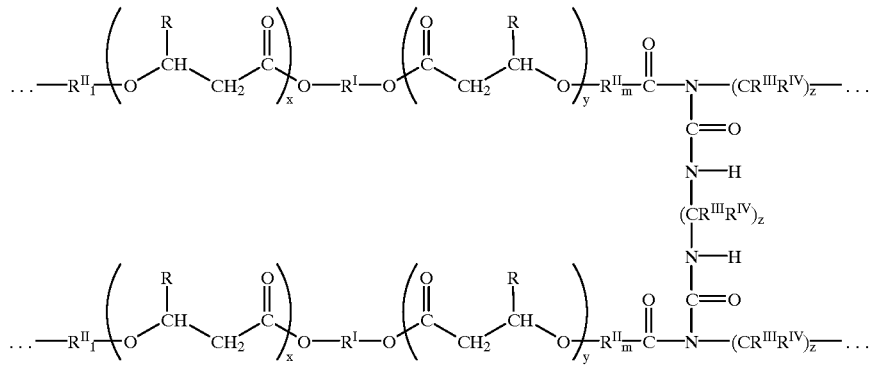

(II)

whereby R, $R^I$, $R^{II}$, $R^{III}$, $R^{IV}$ and x, y, z, l and m are defined as above.

By varying the degree of cross-linking it is possible to adjust the physical, chemical and biological properties of the polyester urethanes in a targeted manner. In particular, it is possible to vary their biodegrad-ability rate, because the biodegradation takes place at a lower rate as the degree of crosslinking increases.

The total number n of the recurring units, i.e. the number of units according to the general formula (I) present per molecule, generally amounts to at least about 2, and may be in the range of up to about 60.

In a preferred embodiment of the invention, the parameters of the general formulas (I) and (II) are in the following ranges: $0 \leq x+y \leq 30$, $2 \leq 1+m \leq 30$, and z=6 to 10. A particularly good rate of biodegradability is available in said ranges, and the polymeric products can be processed in a relatively simple way.

As opposed to the prior art, the polyester urethanes as defined by the invention are transparent and, furthermore, elastic. The deformability of the polyester urethanes as defined by the invention can be steplessly varied from a linear via a partially crosslinked to a completely crosslinked product. It is possible in this way to produce from highly elastic, slightly deformable, to rubber-like, and less deformable rubber-like polymers in a targeted way.

Moreover, the linear polyester urethanes are thermoplastically processible. The crosslinked polyester urethanes, on the other hand, can not be processed thermoplastically; however, they can be molded into the desired shape, for example by injection molding and, if need be, additional processing steps such as, for example cutting or the like. Furthermore, it is particularly advantageous that both the linear and the crosslinked polymers are soluble in organic solvents, but not in water. Moreover, they are completely transparent.

Furthermore, the object of the invention is a process for producing biodegradable polyester urethanes with the following process steps:

(i) Reacting of a bromine acetic acid alkyl ester with an aldehyde of the general formula (A):

(A)

wherein R is an unsubstituted or substituted, saturated or unsaturated ($C_1$–$C_{10}$)-hydrocarbon group, preferably methyl, ethyl or propyl, and the substituents are selected from the group A consisting of halogen, pseudo-halogen, ($C_1$–$C_{10}$)-alkyl, ($C_1$–$C_{10}$)-alkoxy, allyl, vinyl, benzyl, unsubstituted or substituted aryl, such as phenyl or naphthyl, alkenyl, alkinyl, amide, ($C_1$–$C_6$)-dialkylamino, unsubstituted or substituted ($C_3$–$C_8$)-cycloalkyl, and where the aryl or cycloalkyl substituents are halogen, pseudo-halogen, ($C_1$–$C_{10}$)-alkyl, ($C_1$–$C_{10}$)-alkoxy, amide, ($C_1$–$C_6$)-dialkylamino, alkenyl, alkinyl, allyl and/or vinyl;

with a zinc/copper catalyst in an anhydrous organic solvent;

(ii) reacting of the resulting 3-hydroxycarbonic acid derivative with a diol or protected polyol of the general formula (B):

HO—R'—OH  (B)

wherein R' is selected from the group consisting of

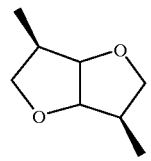
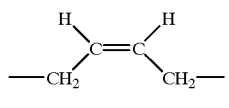

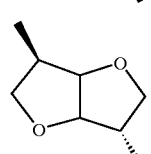
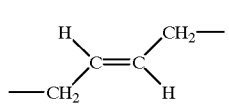

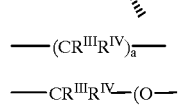

with a=2 to 12, and b=1 to 3000;
whereby $R^{III}$ and $R^{IV}$ are defined as stated above;
for about 8 to 15 hours at approximately 80 to 130° C., in the presence of a tin complex catalyst under protective gas, to an oligo-diol of the general formula (C):

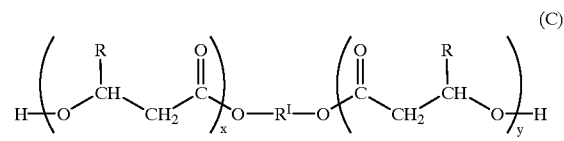
(C)

whereby R and $R^I$ are defined as stated above; and
0<x+y≦60, and for x+y=0, the oligo-diol of the general formula (C)
represents the starting product;
(iii) reacting of the oligo-diol of the general formula (C) with a compound selected from the group consisting of

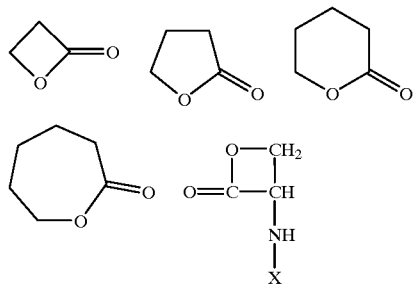

whereby X is any desired protective group, and the compound can be substituted, if need be, with substituents from the above-defined group A;
if necessary in the presence of a tin complex catalyst, for about 4 to 6 hours at approximately 80 to 130° C. and under protective gas, to a macro-diol of the general formula:

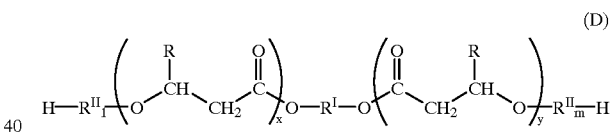
(D)

whereby R, $R^I$ and $R^{II}$ are defined as stated above, and 0≦x+y≦60, and 2≦l+m≦60; and
(iv) reacting of the macro-diol of the general formula (D) with at least one compound containing at least two free isocyanate groups; at about 110° to 140° C. for approximately 6 to 15 hours and under protective gas, to a polyester urethane.

Therefore, according to the process as defined by the invention, a bromine-acetic acid alkyl ester such as, for example bromine acetic acid ethyl ester is first reacted to an aldehyde in step (i) in the form of a known Reformatsky synthesis. In the process as defined by the invention, starting products are employed in this connection that do not ensue from bacterial degradation as in EP 0 696 605 A1. The starting substances are commercially available at favorable cost.

In step (ii), the product so obtained is then reacted with a diol or a suitably protected polyol of the general formula HO—R'—OH (B), to an oligo diol of the general formula (C), whereby the diol can be selected, for example from the group of compounds consisting of 1,4:3,6 dian-hydro-D-mannite, 1,4:3,6-di-anhydro-D-glucite, cis- or trans-butene-1,4-diol, aliphatic diols such as ethylene glycol, 1,4-butane-diol, 1,5-pentane-diol, 1,6-hexane-diol, 1,7-heptane-diol, 1,8-octane-diol, 1,9-nonane-diol, 1,10-decane-diol, 1,12-dodecane-diol, with polyols protected with the usual protective groups known in the prior art, as well as with polyethylene glycols which, if need be, may be mono- or also multiple-substituted.

Starting from said oligo-diol of the general formula (C), which serves as the starting compound for x+y=0, a macro-diol of the general formula (D) is obtained according to step (iii) by reaction with a four-, five-, six- or seven-link cyclic ester or lactone. The following lactones are specified by way of example: β-propio-lactone, γ-butyro-lactone, δ-valero-lactone, ε-capro-lactone, or an N-protected D, L-serine-lactone, whereby it is of course possible to use any protective group X known to the expert in the field. As an alternative, the lactones can be employed not only unsubstituted but also mono- or multi-substituted, whereby the substitutes are selected from the group A defined above.

The specified temperature and time ranges of the individual reaction stages are understood to be ranges from which the suitable parameters can be selected depending on the selected pressure conditions and reaction products of the reaction to be carried out.

Any tin complex such as, for example dibutyl tin oxide, dibutyl tin dilaurate or the like can be employed as the tin catalyst to be used. Advantageously, it is possible to use the compound with the following chemical formula (E):

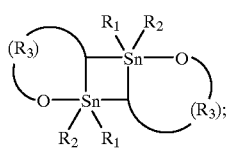

(E)

wherein $R_3$ is —$(CH_2)_k$— with k=1 to 6, and $R_1$, $R_2$ are independently of each other the same or different, and selected from unsubstituted or substituted aryl, whereby the substituents are taken from the group A defined in claims 1 and 7.

According to another advantageous embodiment of the invention, the tin complex catalyst of steps (ii) and (iii) is the dimer of 2,2-Di-n-butyl-1,3,2-dioxastannolane with the following chemical formula (F):

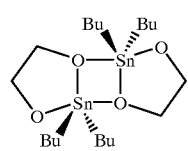

(F)

These tin catalyst complexes are advantageous in the synthesis as defined by the invention. It comes as a complete surprise that they show high yields at a shorter reaction time, as compared to other tin complexes as catalysts. This is shown on the example of the dimer of 2,2-Di-n-butyl-1,3, 2-dioxastannolane with the help of the following Table 1 in detail.

TABLE 1

Effect of various Sn-catalysts on the transesterification reaction

| Catalyst | Reaction time (h) | Yield (%) |
|---|---|---|
| BuSnO | 12 | 94.76 |
| (dimer of 2,2-Di-n-butyl-1,3,2-dioxastannolane) | 10 | >95 |
| Dibutyl tin dimethylate | 12 | 22 80 |
| Dibutyl tin dilaurate | 12 | 48.59 |

Step (ii) for producing the oligodiol is necessarily carried out in the process as defined by the invention with a tin catalyst. The ester interchange reaction, i.e. the separation of ethanol is practically not working in this step without the catalyst. On the other hand, step (iii) for producing the macro-diol can be carried out both with and without the tin catalyst. The step (iii)-reaction subsequently can be carried out directly after step (ii)-reaction without purification of the resulting products (oligo-diols). Because the product of step (ii) then still contains the catalyst, step (iii) is automatically carried out with a catalyst. However, the reaction of step (iii) also works without the catalyst.

Following purification of the oligo-diol (step (ii) product), e.g. precipitated two times from a chloroform solution with cyclohexane, the reaction to macro-diol takes place, whereby the reaction takes place slower in the present case.

As a final step (iv), the polyester urethanes as defined by the invention are obtained by reaction with at least one compound with at least two isocyanate groups.

The expert in the field is familiar with the diisocyanates usable within the framework of the invention. The following compounds are specified by way of example: pentaamethylene-1,5-diisocyanate, hexamethylene-1,6-diisocyanate, heptamethylene-1,7-diisocyanate, 2,2,4-trimethylhexa-methylene diisocyanate, or also any polydiisocyanates satisfying the aforementioned conditions. The diisocyanates also can be employed suitably substituted, whereby the substituents are selected from the group H, —OR, whereby R is as defined above; halogen, pseudohalogen, benzyl, allyl, vinyl, unsubstututed or substituted aryl such as phenyl or naphthyl, ($C_1$–$C_{10}$)-alkyl, alkenyl, alkinyl, amide, ($C_1$–$C_6$)-dialkylamino, unsubstituted or substituted ($C_3$–$C_8$)-cycloalkyl, with at least one hetero-atom, if need be; unsubstituted or substituted five-, six- or seven-link aromatics or hetero-aromatics with at least one hetero-atom, whereby the hetero-atom is O, S or N; and whereby the substituents are taken from group A. Examples of cycloalkyl substituents are cyclopropyl, cyclobutyl, cyclopentyl, cyclohexyl, and the like. Heterocycles that can be considered according to the invention are, by way of example, furyl, thienyl, pyrryl, pyridyl, morpholino, pyrazolyl, imidazolyl, pyrimidinyl, pyrazinyl, tetrahydrofuryl, tetrahydrothienyl, and similar compounds.

The number of substituents is not particularly limited within the framework of the present invention as long as the reaction as defined by the invention is not impaired. The expert is familiar with the criteria that have to be considered in this regard, so that no further explanations are needed to this extent.

In the process as defined by the invention, linear polyester urethanes can be formed by using equimolar amounts of a compound with at least two isocyanate groups, and crosslinked polyester urethanes by using an excess of a compound with at least two isocyanate groups with diisocyanate bridges, such crosslinked polyester urethanes showing other properties depending on the adjusted degree of crosslinking.

The polyester urethane of the invention is generally not as quickly degradable as the block polymer known from EP 0 696 605 A1 produced with bacteriological starting products, which is degraded very rapidly. This is particularly advantageous in long-term applications. Furthermore, the products produced as defined by the invention are not stereo-specific.

Furthermore, the object of the invention is the use of the biodegradable linear or crosslinked polyester urethanes. Because of their high elasticity and transparency, the polyester urethanes as defined by the invention are particularly suited for forming all types of different shaped bodies, for example for foil and sheet materials, laminates, containers and the like. The linear polyester urethane can be thermoplastically processed in this connection in every possible way like conventional plastics; the crosslinked polyester urethane, on the other hand, can be directly brought into the desired shape either by injection molding or the like, or it can serve for coating an article, whereupon further processing steps such as cutting to foil materials or similar products can be carried out.

The polymers can be produced as thin flexible webs than can be wound in coils. Also, composite foils with paper, or coatings of paper in general are possible. The paper coated with polyester urethane continues to be suitable to be written on, and it is made more resistant by such a coating, i.e. it is water- and dirt-repellent, but it continues to remain flexible. Other materials such as, for example starch can be coated with the biodegradable polyester urethanes as defined by the invention as well, rendering such materials more resistant. Also, coating with the polyester urethanes as defined by the invention enhances the hygroscopic properties, and the brittleness of polymer materials based on starch is distinctly reduced.

Another field of application is the use as packaging material, for example for packaging foodstuffs, whereby otherwise unavoidable, toxicologically questionable additives such as, for example plasticizers, can be entirely avoided. In the beverage sector, it is known in connection with plastic bottles that ingredients or auxiliary agents are extracted from such plastic bottles into the beverages contained therein, which was observed especially at elevated room temperatures. Also with foil packagings of meat products, which are commonly used in supermarkets, undesirable absorption of foreign substances from the plastic may ensue, as well as their accumulation preferably in foods with high fat contents. With the polyester urethanes as defined by the invention, no harmful substances can be transferred into the foodstuffs, as it is the case with other plastic materials, in particular as it is the case to some extent with their additives. It is especially advantageous in this connection that the polyester urethanes are impermeable to water and water vapor, or steam, as well as aroma- and fat-tight.

Galenic pharmacy is a particularly important sector in which the polyester urethanes as defined by the invention can be employed. The form of administration of a medication influences the type, duration, direction and strength of the effect of pharmaceuticals. Therefore, the polyester urethanes whose biodegradability, for example in the crosslinked product, can be prolonged or shortened in a controlled, targeted manner, can be used for oral or rectal administration. Possible are in this connection powders, granulates, tablets, pills, lozenges, dragees, capsules or suppositories, whereby the medication contained therein is to be released retarded within a defined period of time. In the medical field of application, the compounds as defined by the invention are particularly important for all types of implants, or also for sutures which are expected to dissolve in the course of time. Of course, the manufacture of common objects of use such as bags, paper bags, cans, bottles, book covers or similar articles is possible as well.

In addition to the application purposes mentioned above for the biodegradable crosslinked polyester urethanes, it is furthermore possible to obtain the desired properties in a targeted manner by adjusting the degree of crosslinking. In this way, hard or soft rubber-like polymers are obtained which can be used, for example as auxiliary agents or thickening agents, but which are always biodegradable. The crosslinked polyester urethanes can be formed in such a way that they can be used, for example as tires for automobiles, bicycles or the like, which, like all other polymers as defined by the invention, even may be completely transparent.

With a suitable degree of crosslinking, the crosslinked polyester urethanes as defined by the invention can be used also as adhesives. This type of all-purpose adhesive is free of solvent, toxicologically entirely harmless, and completely biodegradable. With the polyester urethanes as defined by the invention it is possible to produce also adhesive tapes in a simple way. Such tapes, furthermore, have a good visual appearance because the adhesive layer as well as the coated layer—both capable of being produced from the material as defined by the invention—are transparent.

The polyester urethanes as defined by the invention can be added to any desired material at any desired mixing ratios, for example in order to provide such materials with hydrophobic properties, and/or in order to obtain biodegradable polymer blends with advantageous properties. Such polymer blends may contain the biodegradable linear and/or the crosslinked polyester urethanes depending on the field of application, in an amount suitable for such application, whereby it is possible to additionally incorporate further biodegradable polymers. Biodegradable polymers that can be considered in this connection are, for example bacterially produced poly-3-hydroxy alkanoates. In mixtures with starch and/or cellulose powder it is possible also to produce so-called composite materials that will exhibit the aforedescribed advantages of the compounds as defined by the invention.

The polymer blends can be used in the same fields of application as described above for the linear or crosslinked polyester urethanes, so that more detailed statements may be dispensed with here in order to avoid repetitions.

The polyester urethanes as defined by the invention naturally also can be dyed with dyes suitable for the intended purpose, whereby dyes for foodstuffs would have to be mentioned in this connection, among others.

Advantageous further developments can be derived from the dependent claims.

BRIEF DESCRIPTION OF THE DRAWINGS

Additional advantages, properties and special features of the polyurethanes as defined by the invention are explained in greater detail in the following with the help of the attached figures, in which.

DETAILED DESCRIPTION OF THE PREFERRED EMBODIMENTS

Figure 1:
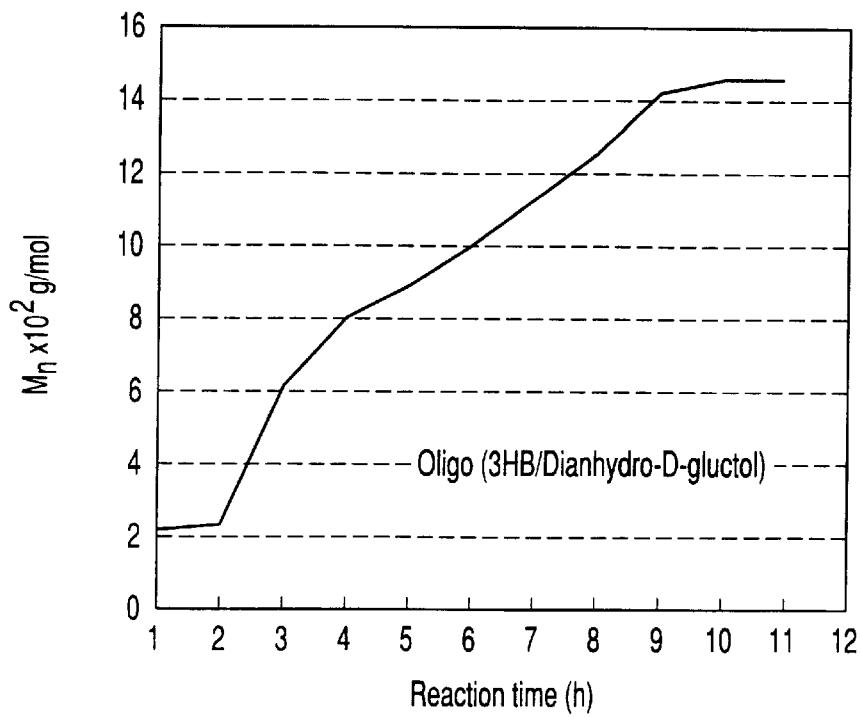
FIG. 1 shows the change in the molecular weight in the trans-esterification in the process as defined by the invention.
Figure 2:
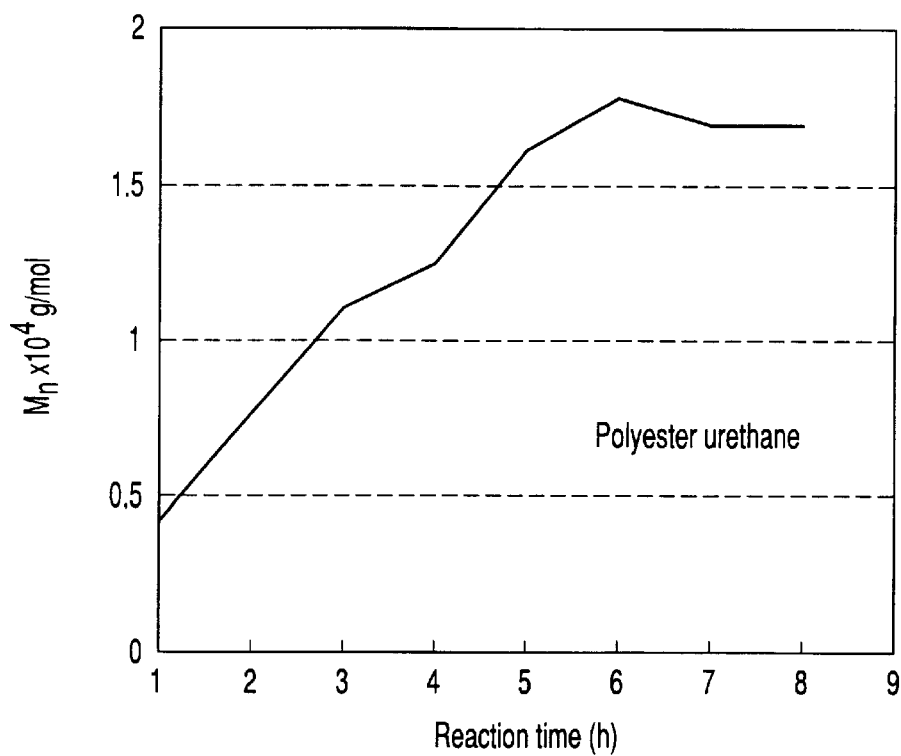
FIG. 2 shows the change in the molecular weight in the polymerization of the oligomers with diisocyanate in the process as defined by the invention.

The thermoplastic polyester urethanes synthesized from macro-diols, which can be produced with and without racemic hydroxy-butyric acid, and which derive from various diols reacted with diisocyanate, as well as their block copolymers with aliphatic oligo-ester segments, have good processibility, flexibility, toughness and biodegradability. Said properties are shown in greater detail with the help of the figures. FIG. 1 shows the change in the molecular weight during the trans-esterification reaction of the oligomers of ethyl-3-hydroxybutyrate (3HB) and di-anhydro-D-glucite, reacted with 1% by weight Bu$_2$Sn=O; and FIG. 2 shows the change in the molecular weight during the polymerization reaction of the macro-diol structured from the following components: ethyl-3-hydroxy-butyrate/$_\epsilon$-caprolactone/di-anhydro-D-glucite with 1,6-hexamethylene diisocyanate, carried out without catalyst, leading to a polyester urethane as defined by the invention. Both curves show the constant increase of the molecular weight, until it remains at a nearly constant level, which indicates that the reaction is completed.

The synthesized polyester urethanes have molecular weights of up to $\overline{M}n=1.08\times10^5{}_{GPC}$, as well as a relatively high polydispersity of $\overline{M}_w/\overline{M}_n=1.57$ to $2.36_{GPC}$. Furthermore, they have a broad melting range of 310 K to 440 K$_{DCS}$, and Tg=259.37, up to about 288.85 K$_{DSC}$. The decomposition points are around 600K$_{TG}$.

The $^1$H-NMR-spectra shown in FIGS. 3A to 3C, 4 and 5, and the IR-spectrum are discussed in connection with the examples of preparation of the individual compounds.

Figure 6:
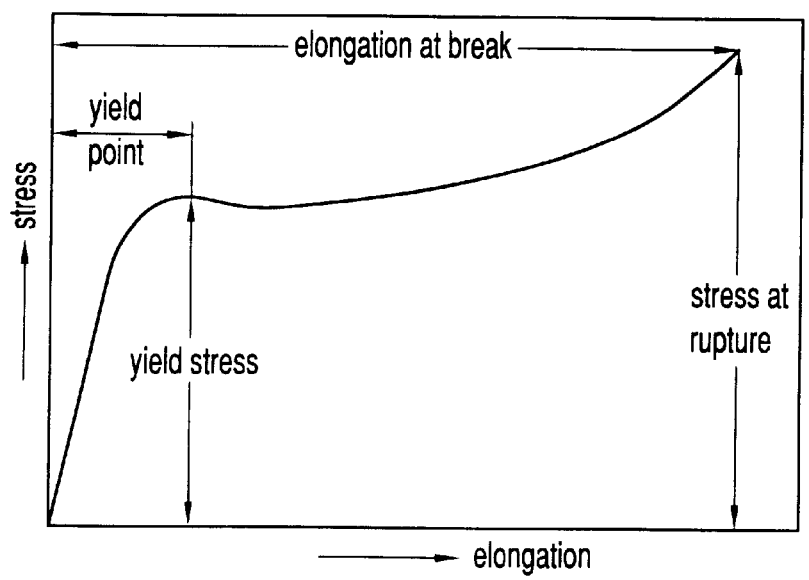
FIG. 6 shows a general "elongation-at-break" curve of plastics.

FIG. 6 shows a common elongation-at-break curve for plastics, showing the elongation up to breakage of a conventional plastic material.

Figure 7:
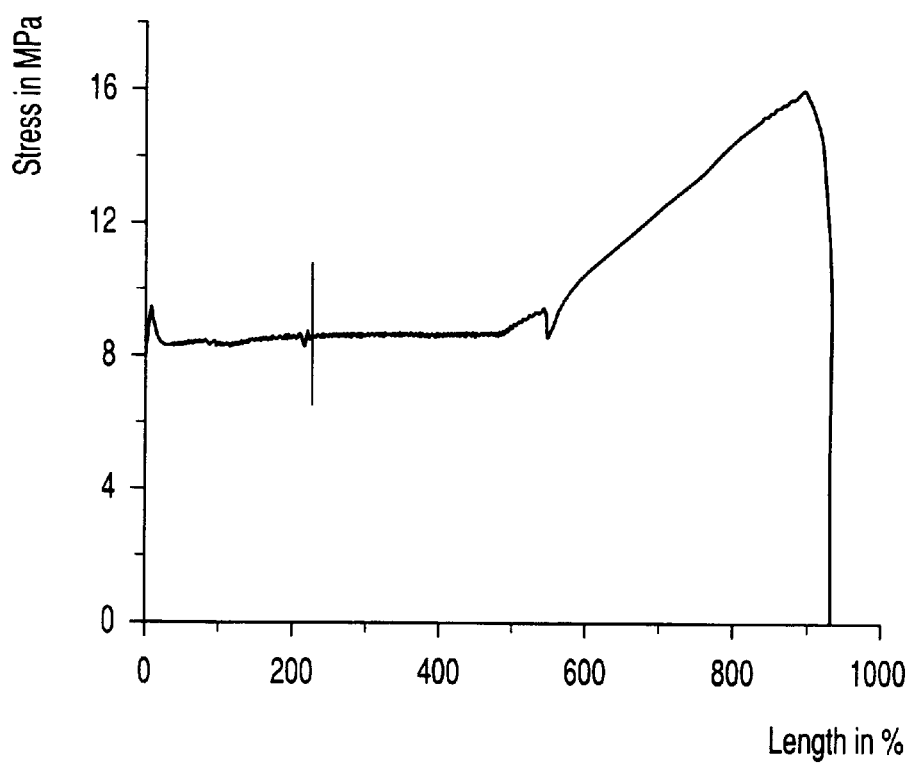
FIG. 7 shows a "tear-off"-curve of a linear polyester urethane as defined by the invention.

FIG. 7 shows a tear-off curve of a linear polyester urethane as defined by the invention, which is composed of the components ε-caprolactone/dianhydro-D-glucite/hexamethylene diisocyanate, whereby x+y=0, and 2≦1+m≦60. The tear-off test was carried out on a Zwick test machine at 25° C., at a test speed of 10 mm/min, whereby the data were processed with Zwick PC software 'Z 703b'. A test foil specimen with the following parameters was used:

| Thickness a | (mm) | 0.0850 |
| Width b | (mm) | 4.2000 |
| Cross section | (mm$^2$) | 0.3570 |
| Measured length | (mm) | 13.79. |

The test results found were as follows:

| Fmax | (N) | 5.731 |
| Distance @ Fmax | (%) | 895.36 |
| Sigma-actual | (MPa) | 159.79 |
| Sigma 100 | (MPa) | 0.00 |

Accordingly, FIG. 7 shows that the polyester urethane as defined by the invention has high ductility, whereby elongation means that the material is tough, as opposed to materials with brittleness, which is absent in this case. For example, Biopol® exhibits an elongation of only about 3%, i.e. that the material as defined by the invention is by far superior to the bacterial material available in the trade.

Numerous tensile tests were carried out; the data found in said tests are summarized in Table 2.

TABLE 2

Tear resistance of biodegradable polymers as compared to Polyester urethanes as defined by the invention.

| Biodegradable polymer | Tearing stress (MPa) | Elongation at break (%) |
|---|---|---|
| Polyester urethane* (BCG) | 12.69 | 571.0 |
| Polyester urethane* (CG) | 26.72 | 793.6 |
| Biopol ® | 24.70 | 6.2 |

TABLE 2-continued

Tear resistance of biodegradable polymers as compared
to Polyester urethanes as defined by the invention.

| Biodegradable polymer | Tearing stress (MPa) | Elongation at break (%) |
|---|---|---|
| PHO | 10.03 | 540.4 |
| (50/50) Mixture of polyester urethane* (CG) and Biopol ® | 28.54 | 676.0 |

The letters in parentheses denote the components from which the polyester urethanes are structured:
B 3-hydroxybutyric acid
C ε-caprolactone
G Dianhydro-D-glucite
PHO Poly-3-hydroxy octanoate
*as defined by the invention.

Table 2 shows that the tearing stress and elongation at break of the polyester urethanes as defined by the invention come to about σ=26.72 MPa and, respectively, 763.60% of the respective starting length. It was possible to eliminate with the polyester urethanes as defined by the invention the brittleness as exhibited by bacterially produced polyesters. In particular the elongation at break of the polyester urethanes as defined by the invention is surprisingly good and by far superior to the one of the bacterially produced Biopol®. Furthermore, a mixture of Biopol® with the polyester urethanes as defined by the invention exhibits exceptionally good properties.

Figure 8:
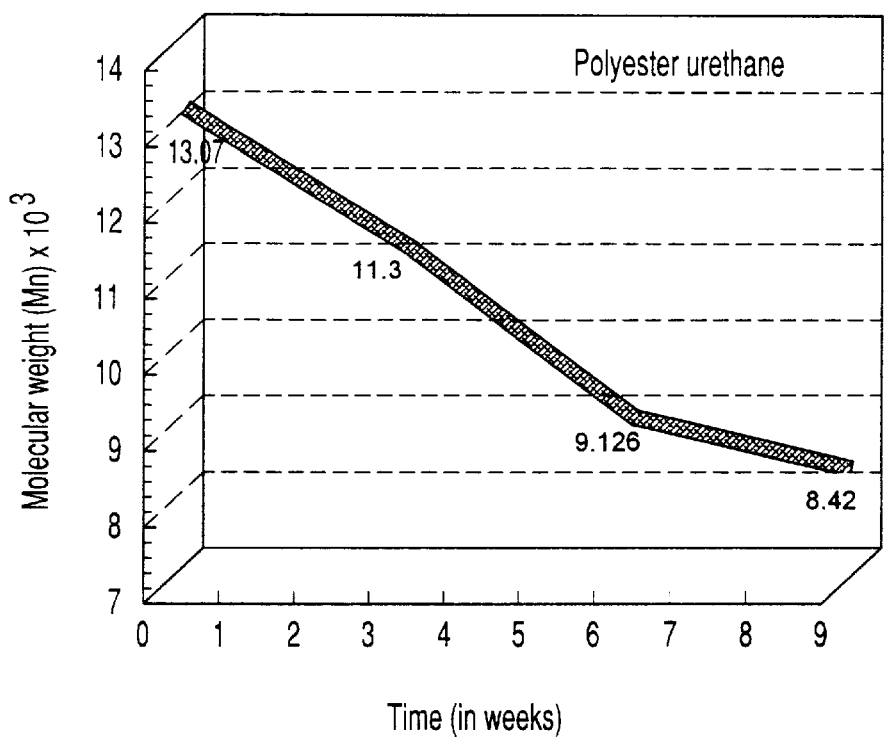
FIG. 8 shows the effect exerted by the hydrolysis on the molecular weight of the polyester urethanes as defined by the invention.

The synthetic polyester urethanes as defined by the invention are biodegradable by enzymes and microorganisms and also by hydrolysis, as shown in detail by the following figures. The effect exerted by hydrolysis on the molecular weight of the polyester urethanes as defined by the invention, consisting of 3-hydroxybutyric acid, 1,4:3,6-dianhydro-D-mannite and 1,6-hexamethylene diisocyanate, in buffer solution (pH=7.0) and at 36° C., is shown in FIG. 8. After 9 weeks of hydrolysis, the film specimen only shows still 64% of the molecular weight ($\overline{M}_n$=8.42×10$^3$) of the original value ($\overline{M}_n$=13.07×10$^3$); however, this did not impair the mass.

Figure 9:
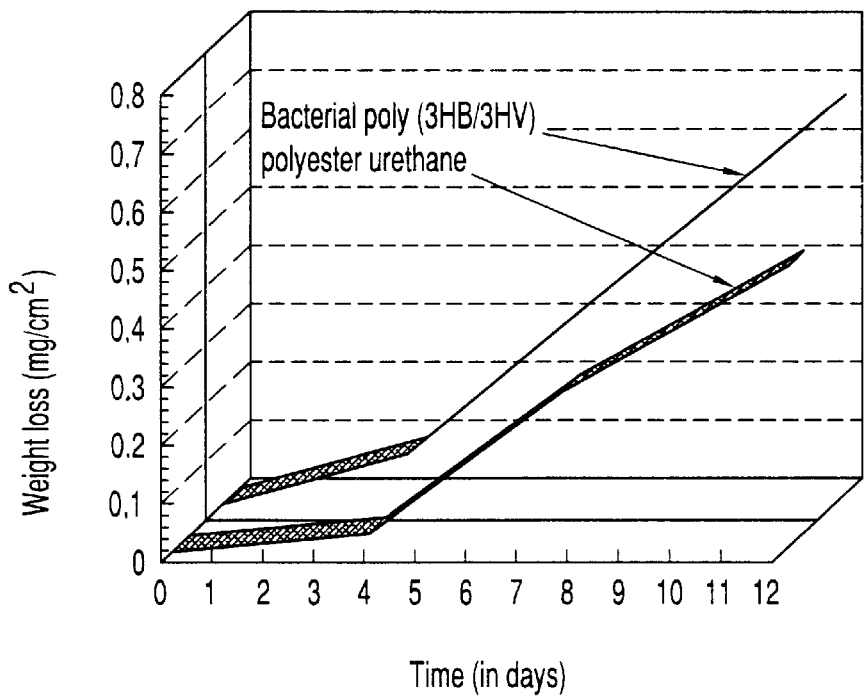
FIG. 9 shows the enzymatic biodegradation of the polyester urethane of the invention as shown in FIG. 8, compared with prior art bacterial polymers structured from 3-hydroxybutyric acid and 3-hydroxy-valeric acid components.

FIG. 9 shows the enzymatic biodegradation of the polyester urethane of the invention as shown in FIG. 8, compared with the bacterial polymers structured from 3-hydroxybutyric acid and 3-hydroxy-valeric acid components, which are similar to the blockpolymers known from EP 0 695 605 A1, in buffer solution (pH=7) with lipase from *Rhizopus delemar* (200 μg/ml), at 25° C.

The following test was carried out in order to illustrate the processes causing degradation, for example of a sheet made of polyester urethanes as defined by the invention.

Figure 10A:
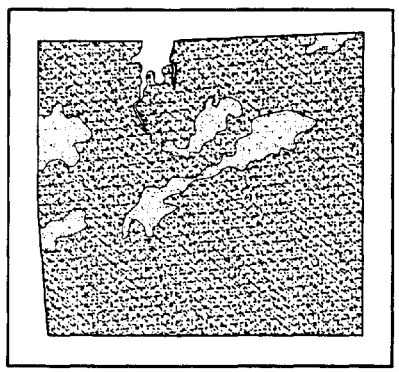
FIGS. 10A to 10E show the biodegradation of the polyester urethanes as defined by the invention, of Biopol®, as well as of a polyester urethane/Biopol® mixture.

Sheet specimens with a size of 1 sq.cm and a thickness of about 0.1 to 0.2 mm of linear polyester urethanes, as defined by the invention, of Biopol® and polyester urethane/Biopol® mixture, each were stored for 4 weeks in a flower pot at 17° C. The sheet was subsequently controlled and photographed. The figures show in detail the biodegradation after 4 weeks of the following product:

FIG. 10A: Linear polyester urethane, structured from the components 3-hydro-xybutyric acid/ε-caprolactone/dianhydro-D-glucite/hexamethylene diisocyanate.

Figure 10B:
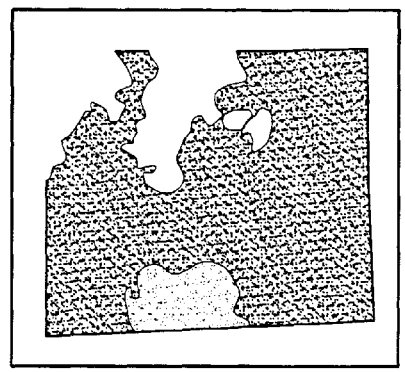

FIG. 10B: Linear polyester urethane structured from the components ε-caprolactone/dianhydro-D-glucite/hexamethylene diisocyanate.

Figure 10C:
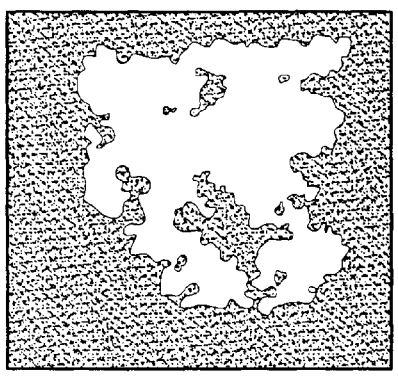

FIG. 10C: Biopol®, i.e., a copolyester with the components 3-hydroxybutyric acid and 3-hydroxyvaleric acid.

Figure 10D:
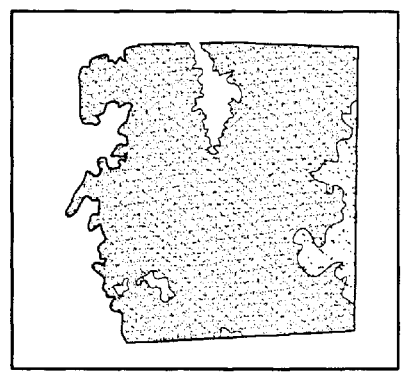

FIG. 10D: Polyester urethane/Biopol® mixture (50:50), i.e., the compositions from FIGS. 10B and 10C were mixed together.

Figure 10E:
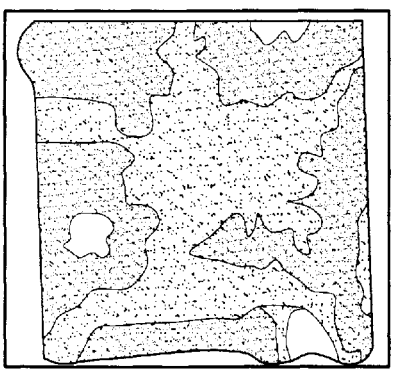

FIG. 10E shows the biodegradation of a crosslinked polyester urethane also structured from the components 3-hydroxybutyric acid/ε-caprolactone/dianhydro-D-glucite/hexamethylene diisocyanate (excess), which was stored in the form of a 1 sq.cm sized film with a thickness of about 0.1 to 0.2 mm in a flower pot at 17° C. for 4 weeks, and subsequently photographed. It is readily possible to derive from this figure that on the one hand, the rate of biological degradation of the crosslinked polyester urethane in very much lower in the present example than the one of the linear polyester urethane, and that the biodegration of Biopol®, on the other hand, takes place at a higher rate.

Figure 11:
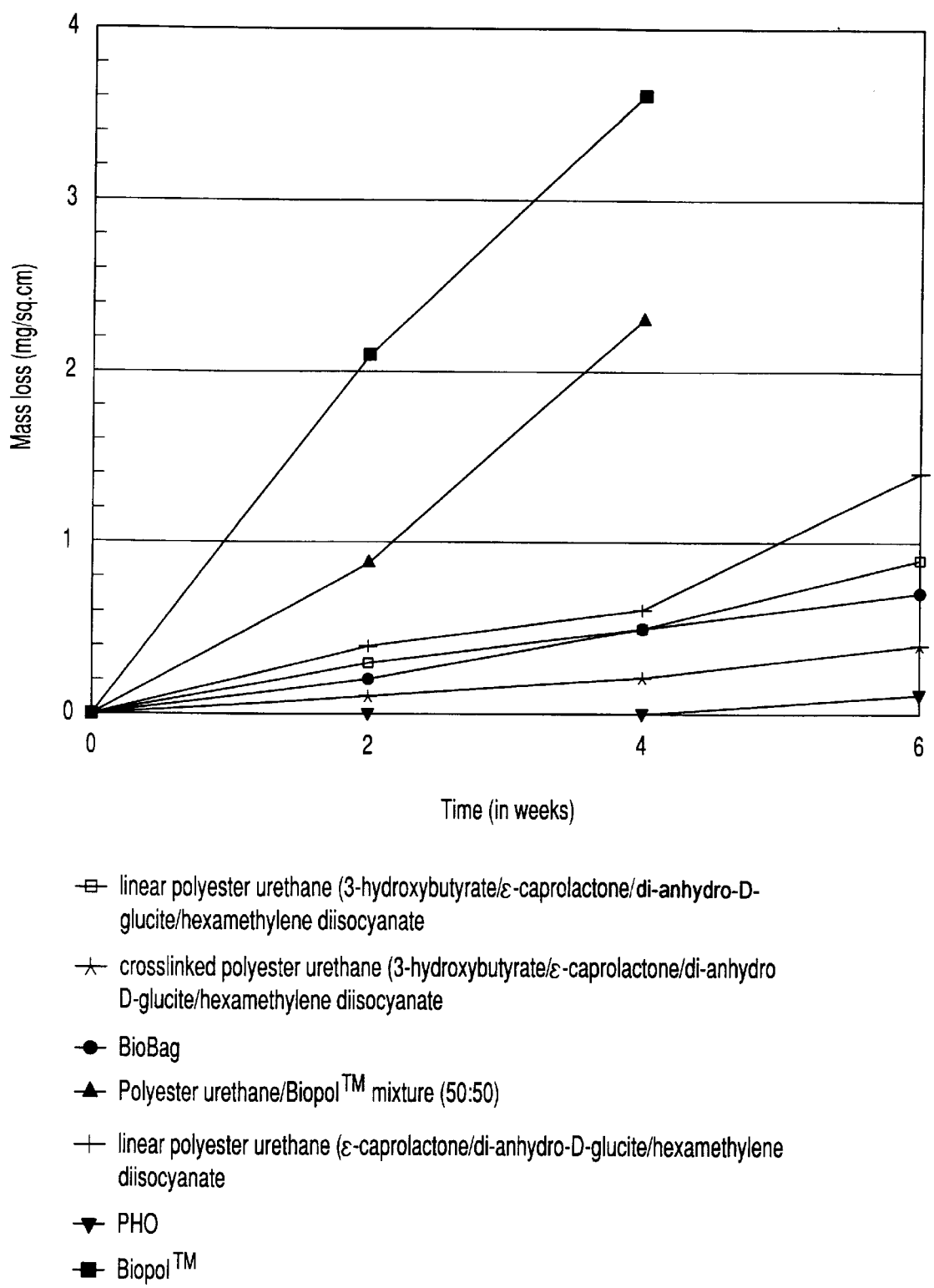
FIG. 11 shows the graphic representation of the weight losses of the polyester urethanes as defined by the invention caused by biodegradation.

FIG. 11 shows in a graphical representation the weight loss of the polyester urethane as defined by the invention caused by biological degradation, as compared with other polymers. In the present case, several polyester urethanes as defined by the invention, with x+y=10, and 1+m=6, said polyester urethanes having been structured from the components specified in the legend of FIG. 11, were tested with respect to their biodegradability. Furthermore, the polyester urethane of the invention contained in the polyester urethane/Biopol®\ mixture (50:50), is structured with the components e-caprolactone/dianhydro-D-glucite/hexamethylene diisocyanate. The BioBag-material, which was tested as well, is a product marketed under the trademark PACLAN® of the firm Folien- und Handelsprodukt GmbH in Henfenfeld. This product exclusively consists of vegetable starch and is currently the only compostable and, therefore, biodegradable bag available in the market. It is externally comparable to plastic. The drawback of this environmentally friendly material is that it is very expensive to produce, and that, furthermore, it is not stable at temperatures above 35° C. Moreover, the transparent bag is sensitive to water and sunlight.

Overall, the tests show that all polymers as defined by the invention have comparable rates of biodegradation. They are biodegraded more rapidly than starch polymers, bacterial poly-3-hydroxyoctanoic acid (PHO) and synthetic polyamides, but at a substantially lower rate than Biopol®. The manufacture of the individual polyester urethanes as defined by the invention is explained in detail in the following in examples, whereby said examples, of course, do not limit the scope of protection of the present invention, but are intended only for illustration purposes.

EXAMPLES OF PREPARATION

Example 1
Preparation of a Linear Polyester Urethane.

The biodegradable linear polyester urethanes with the components 3-hydroxybutyric acid/e-caprolactone/dianhydro-D-glucite/hexamethylene diisocyanate were prepared according to the following reaction pattern:

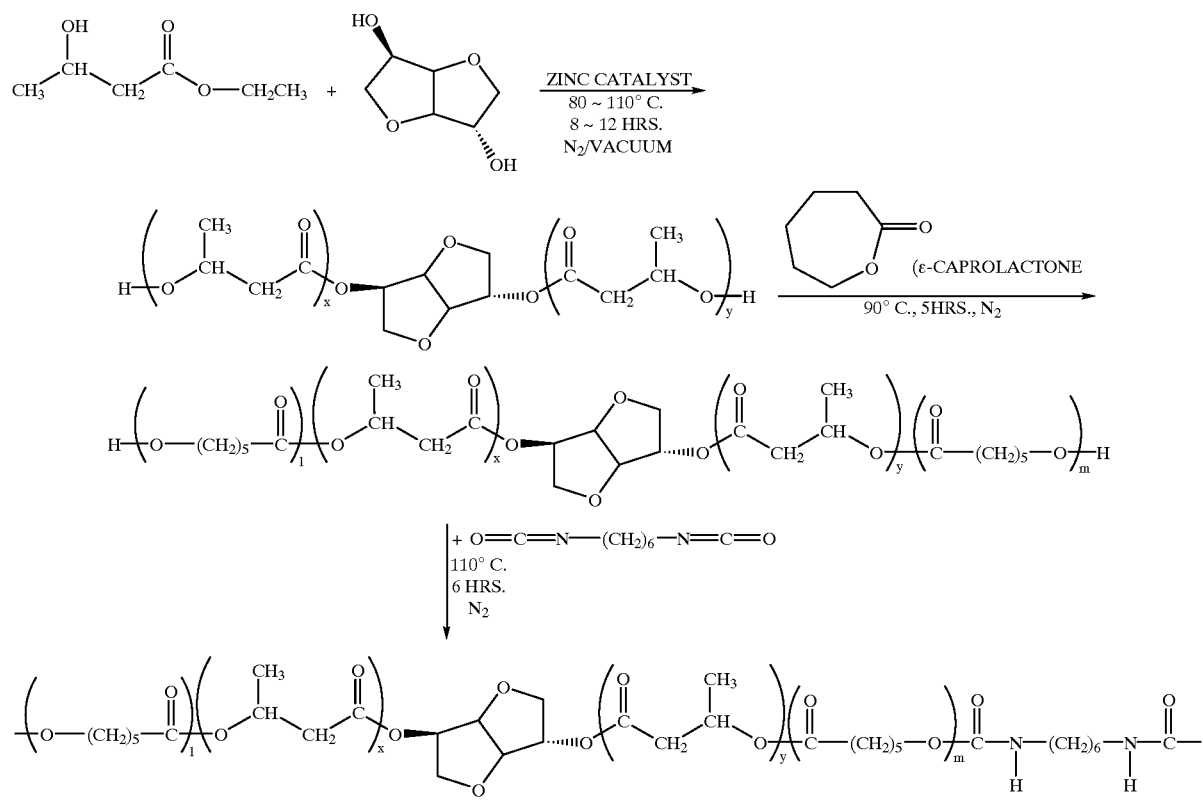

The preparation was carried out in this connection as follows:

1.1 General instructions for the preparation of (R, S)-3-hydroxycarbonic acid esters 44 g of a zinc-copper complex activated with copper (II) acetate was required for a 0.5 molar batch preparation, into which was stirred 40 g pulverized zinc and 4 g copper (II) acetate in 50 ml. concentrated acetic acid over about ½ hour at room temperature. The acetic acid was subsequently decanted and the Zn—Cu complex was washed with water and dry ether. Later drying on the oil pump increased the reactivity.

The pulverized Zn—Cu complex in 200 ml. absolute benzol was loaded in a 1000-ml. three-neck flask with reflux cooler and agitator. The material was gradually heated up to boiling and a mixture of 0.5 mol of the respective aldehyde and 88 g (0.53 mol) bromine acetic acid ethyl ester is added dropwise in such a way that boiling was maintained without further heating. The start of the reaction was indicated by strong foaming and high generation of heat. Following the dropwise addition (over about 1 hour), the reaction mixture was stirred for another hour until it had cooled to room temperature.

The reaction mixture was then cooled with a cold mixture (ice/cattle salt) to about −10° C. About 100 ml. half-concentrated sulfuric acid was than added dropwise in such a way that the internal temperature did not exceed 35° C. The organic layer was separated and washed neutral two times with about 300 ml. water. Drying was subsequently carried out over magnesium sulfate. The solvent was centrifuged off and the 3-hydroxycarbonic acid ethyl ester was purified by vacuum distilling.

1.1.1 Preparation of 3-hydroxybutyric acid ethyl ester Batch:

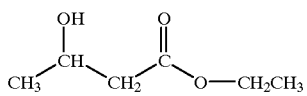

| | | |
|---|---|---|
| 40 g | | zinc powder; |
| 4 g | | copper (II) acetate; |
| 50 ml | | acetic acid (conc.); |
| 100 ml | | benzol (abs.); |
| 29 ml | (0.5 mol) | acetaldehyde; |
| 54 ml | (0.5 mol) | bromine acetic acid ethyl ester. |

40 g zinc powder, 4 g copper (II) acetate and 50 ml acetic acid (conc.) was combined in a flask with a drying tube, stirred for 1 hour at room temperature, and then washed with diethyl ether and dried. Boiling was carried out under reflux with 100 ml. benzol (absolute). Thereafter, 29 ml. (0.5 mol) acetaldehyde and 54 ml. (0.5 mol) bromine-acetic acid ethyl ester was gradually added dropwise under stirring, and stirring was continued for 1 hour at room temperature. Cooling was carried out, and half-concentrated sulfuric acid was gradually added dropwise to the cold bath. The organic phase was washed neutral with water and dried over magnesium sulfate. After the solvent was distilled off, the product was distilled under vacuum.

Yield: 50 ml. (0.38 mmol)=76% of theory. $^1$H-NMR-measurement: Solvent $CDCl_3$, with 1% TMS standard δ: 0.9–1.7 ppm(t), 2.3–2.7 ppm(d), 3.6–3.9; ppm(s), 3.9–4.5 ppm(m).

1.1.2 Preparation of 3-hydroxyoctanoic acid ethyl ether.

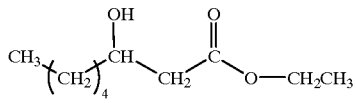

| Batch: | 150 g | zinc powder; |
| --- | --- | --- |
| | 15 g | copper (II) acetate |
| | 100 ml. | acetic acid (conc.); |
| | 100 g (1 mol) | 1-hexanal |
| | 120 ml. | bromine acetic acid ethyl ester |
| | 200 ml. | toluene (abs.). |

150 g zinc powder, 15 g copper (II) acetate and 100 ml. acetic acid (conc.) was combined in a flask with drying tube and stirred for 40 minutes at room temperature. After the mixture was washed neutral with water, it was washed with acetone and ether and dried. 200 ml toluene absolute was added to the Zn—Cu-complex and a mixture of 120 ml bromine-acetic acid ethyl ester and 100 g 1-hexanal was gradually added dropwise (over about 1 hour) at 100° C. Cooling was carried out with ice, and 5-molar sulfuric acid was added dropwise. Filtration was carried out and the aqueous phase was separated. The organic phase was washed neutral with water and dried over magnesium sulfate. After the solvent was distilled off, the product was distilled under vacuum.

Yield: 95.9 g=51% of theory. $^1$H-NMR-measurement: Solvent $CDCl_3$ with 1% TMS-standard. δ: 0.6–2.0 ppm(m), 2.3–2.7 ppm(d), 3.0–3.5 ppm(s), 3.8–4.9 ppm(m)

1.2 Preparation of the oligo-diols 1.2.1 Preparation of bifunctional oligomer of 3-hydroxybutyric acid ethyl ester and 1,8-octane-diol with a tin complex catalyst.

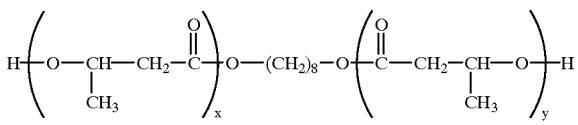

Batch: 6.6 g (0.05 mol) 3-hydroxybutyric acid ethyl ester 0.73 g (5 mmol) 1,8-octane-diol 0.073 g (1% by wt.) tin complex catalyst.

6.6 g 3-hydroxybutyric acid ethyl ester, 0.73 g 1,8-octane-diol and 0.073 g (1% by wt. of the total weight ) tin complex as catalyst was combined in a two-neck flask with a distilling apparatus. Stirring was carried out for 3 hours at 120° C. under Ar flow, and resulting ethyl alcohol was distilled off by the cooler. Stirring was continued for 2 hours at 130° C. under vacuum, and the nonreacted part was distilled off. The raw product was measured by thin-layer chromatography and purified column-chromatographically.

Product: Viscous, light-yellow liquid; Yield: 3.80 g=85.78% of the theory.

1.2.2 Preparation of bifunctional oligomer of 3-hydroxybutyric acid ethyl ester and cis-2-butene 1,4-diol with n-dibutyl tin oxide.

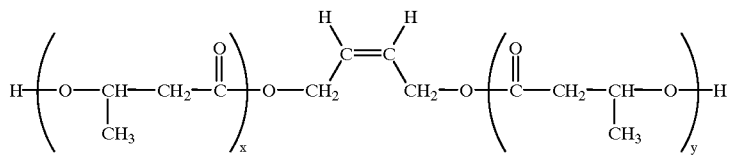

Batch preparation: 6.608 g (0.05 mol) 3-hydroxybutyric acid ethyl ester 0.13 g (1.46 mmol) cis-2-butene-1,4-diol;

0.068 g (1% by wt.) n-dibutyl tin oxide.

6.608 g freshly distilled 3-hydroxybutyric acid ethyl ester and 0.068 g (1% by wt. of total weight) n-dibutyl tin oxide catalyst was combined in a two-neck flask with distilling apparatus. Stirring was carried out under Ar-flow for 11 hours at 110° C. and resulting ethyl alcohol was distilled off. Stirring was continued for a short time under vaccum at 110° C. Thereafter, 0.13 g cis-2-butene-1,4-diol was added with a syringe and stirring was continued under flow of Ar for 5 hours at 110° C., and the ethyl alcohol was distilled off. Stirring was continued again for 2 hours at 110° C. under vacuum, and the nonreacted part was distilled off. The crude product was dissolved in about 10 ml chloroform and precipitated two times in 200 ml cold n-hexane. Following removal of the solvent by centrifuging, the oligomer was dried over 10 hours under high vacuum.

Product: viscous, light-yellow liquid; Yield: 3.75 g=84.56% of theory. $^1$H-NMR-measurement: Solvent $CDCl_3$ with 1% TMS-standard (see FIG. 3A). δ: 0.7–1.5 ppm(m), 2.0–2.8 ppm(m), 3.4–3.8 ppm(s), 3.9–4.4 ppm(m), 4.5–4.9 ppm(d), 5.0–5.6 ppm(m), 5.6–5.9 ppm(t).

1.2.3 Preparation of bifunctional oligomer of 3-hydroxybutyric acid ethyl ester and ethylene glycol-400 with tin complex catalyst.

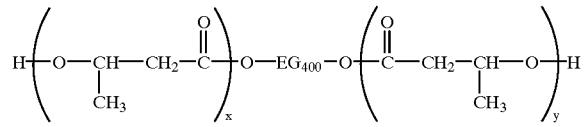

Batch preparation: 13.22 g (0.1 mol) 3-hydroxybutyric acid ethyl ester; 2.0 g (5 mmol) ethylene glycol 400 ("$EG_{400}$"); 0.132 g tin complex catalyst (1% by wt. of 3HB-ethyl ester).

13.22 g freshly distilled 3-hydroxybutyric acid ethyl ester, 2.0 g ethylene glycol 400, and 0.068 g (1% by wt. of 3-hydroxybutyric acid ethyl ester) tin complex catalyst was combined in a two-neck flask with distilling apparatus.

Stirring was carried out for 7 hours at 110° C. under flow of nitrogen, and resulting ethyl alcohol was distilled off by the cooler. Thereafter, stirring was carried out for 2 hours under vacuum at 110° C. The nonreacted part was distilled off under high vacuum. The crude product was then precipitated two times by a chloroform solution in cold n-hexane. After the solvent was removed by centrifuging, the oligomer was dried over 10 hours under vacuum at room temperature.

Product: viscous, light-yellow liquid; Yield: 6.37 g=41.86% of the theory. $^1$H-NMR-measurement: Solvent CDCl$_3$ with 1% TMS-standard (see FIG. 3B). δ: 0.7–1.7 ppm(m), 2.1–2.8 ppm(m), 3.2–3.5 ppm(s), 3.5–3.8 ppm(s), 3.8–4.5 ppm(m), 4.8–5.7 ppm(m).

1.3 Preparation of a macro-diol 1.3.1 Preparation of bifunctional oligomer of 3-hydroxybutyric acid ethyl ester, ε-caprolactone, and di-anhydro-D-glucite with tin complex catalyst.

Batch preparation: 154.34 g (1.17 mols) 3-hydroxybutyric acid ethyl ester 8.55 g (0.58 mol) di-anhydro-D-glucite; 133.56 g (1.17 mols) ε-caprolactone; and 1.54 g (1% by wt. dibutyl tin oxide) (catalyst) of the ethyl ester.

154.34 g freshly distilled 3-hydroxybutyric acid ethyl ester, 8.55 g di-anhydro-D-glucite and 1.54 g dibutyl tin oxide catalyst was loaded at room temperature under protective nitrogen gas atmosphere in a two-neck flask provided with a distilling apparatus. Stirring was carried out at 110° C. under flow of nitrogen for 2 hours, and liberated ethanol was distilled off. Subsequently, stirring was carried out for 6 hours at 110° C. under a pressure of 25 mbar, and finally for 3 hours under high vacuum. The viscous, light-yellow product had a molecular weight of $\overline{M}n=1.725\times10^3$ g/mol (GPC).

133.56 g ε-caprolactone was added and stirring was carried out for 6 hours under nitrogen at 100° C. The product was then dissolved in chloroform and precipitated in cyclohexane, and then separated and dried under vacuum at room temperature. The molecular weight of the product was $\overline{M}n=3.702\times10^3$ g/mol (GPC). A bifunctional oligomer of the following formula was obtained, whereby x+y=18, and 1+m=14:

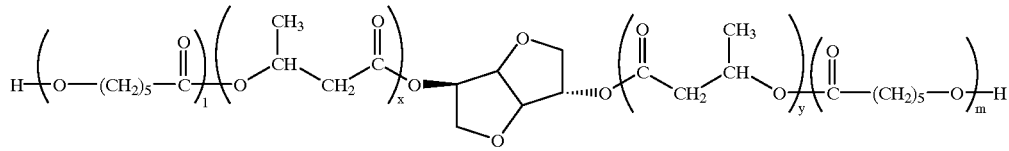

Figure 3A:
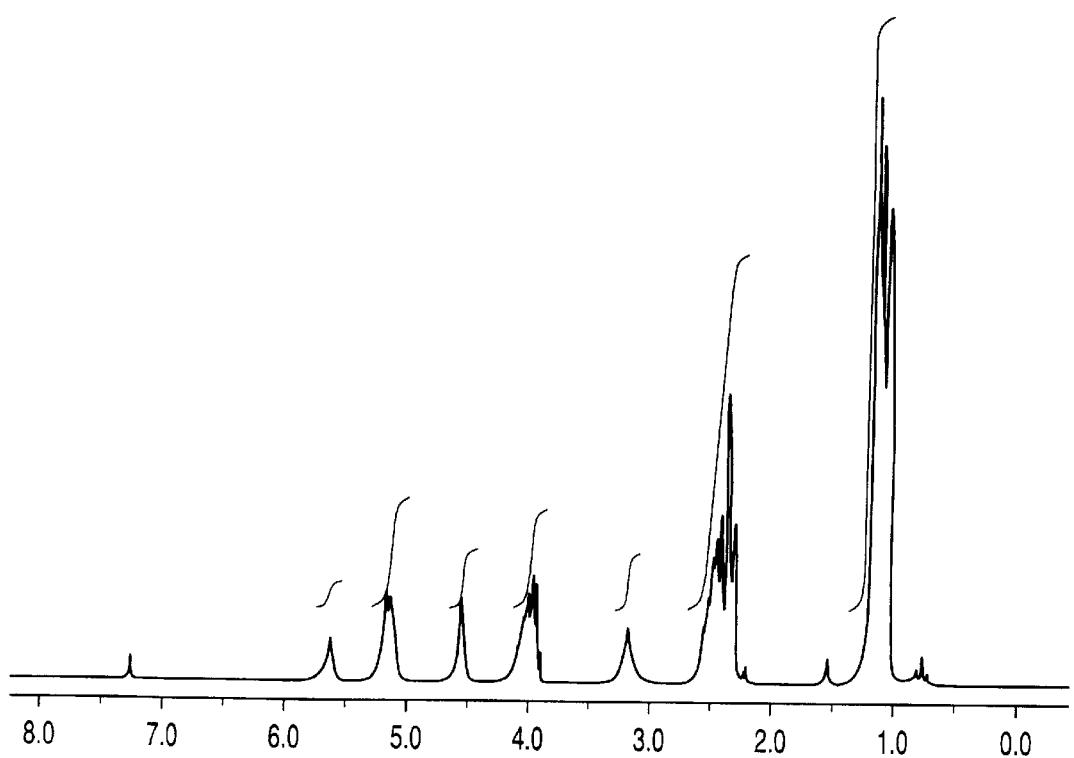
FIGS. 3A to 3C show $^1$H-NMR-spectra of oligo-diols as defined by the invention.
Figure 3B:
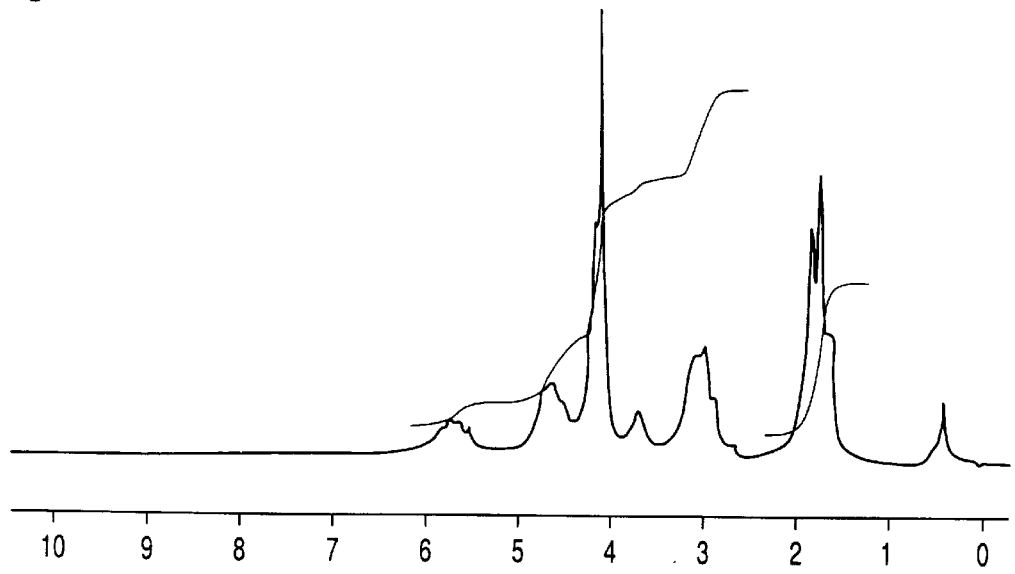
Figure 3C:
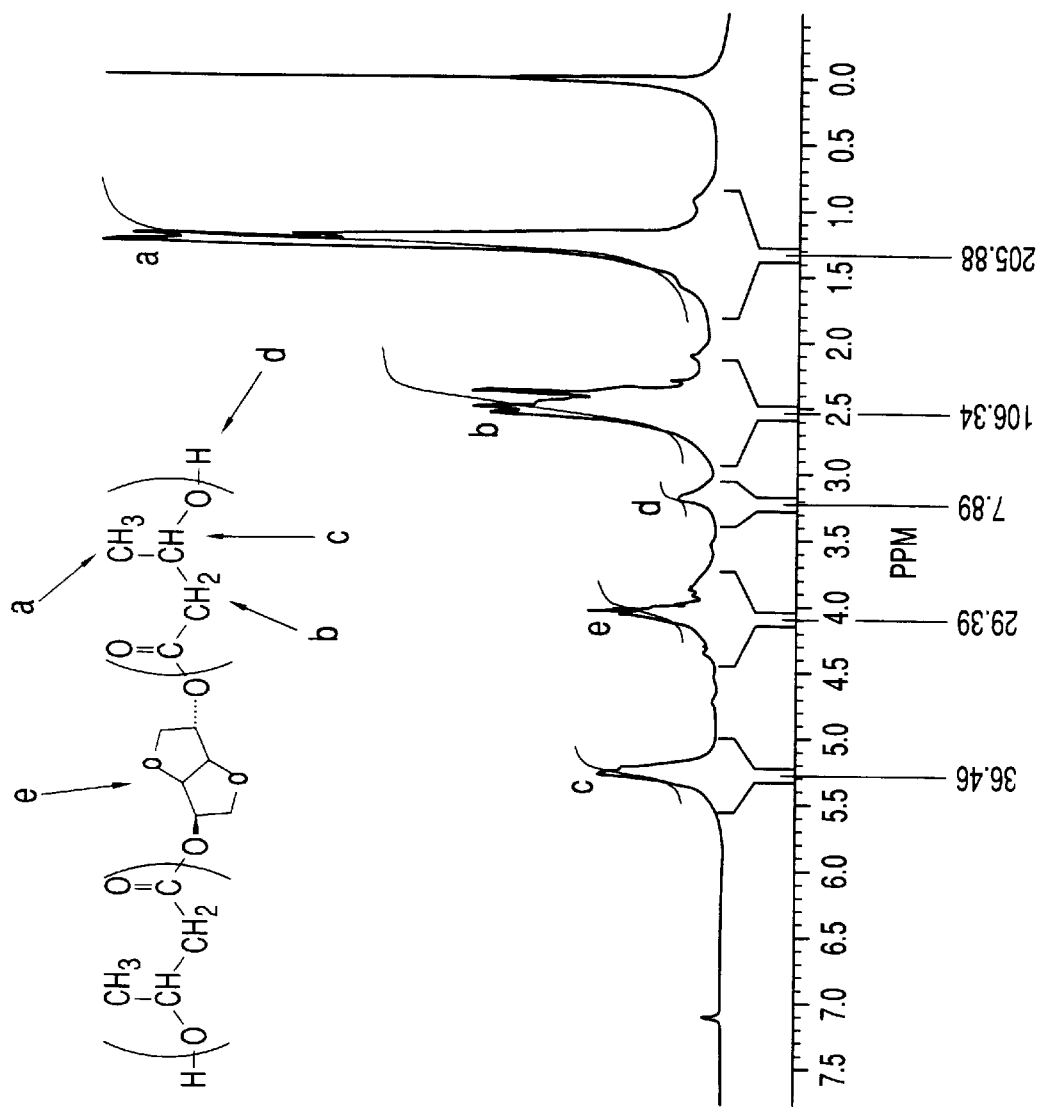
Figure 4:
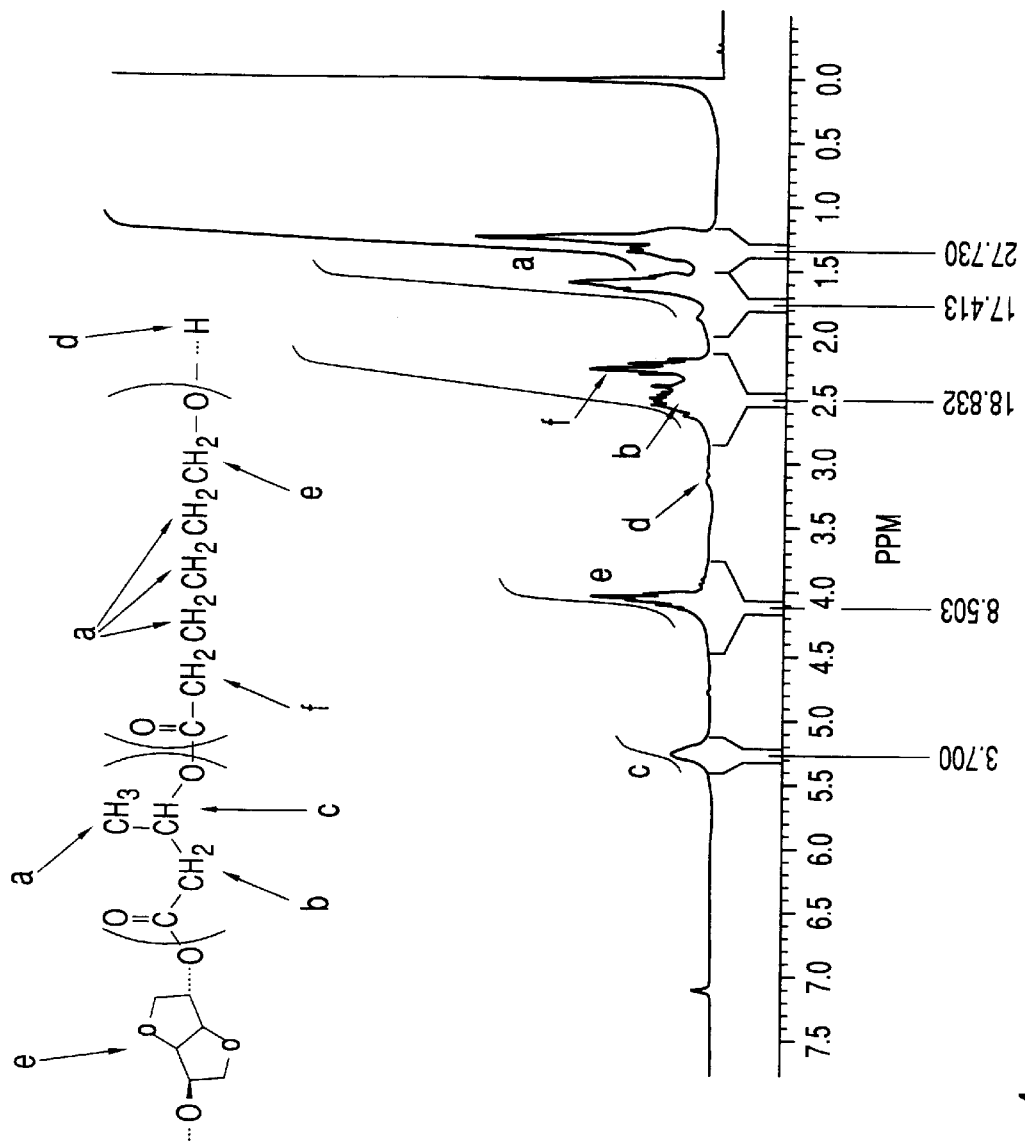
FIG. 4 shows the $^1$H-NMR-spectra of a macro-diol as defined by the invention.

The $^1$HNMR-spectra, recorded in CDCl$_3$ with 1% TMS-standard, of the oligo-diol and macro-diol prepared in the present example are shown in FIGS. 3C and 4, where the spectra are individually explained graphically with the help of the structural formulas.

1.4 General instructions for preparing a linear polyester urethane as defined by the invention; polymerization of a bifunctional oligomer with 1,6-hexamethylene diisocyanate.

Batch preparation: 100.00 g (0.027 mol) bifunctional oligomer;

5.05 g (0.03 moi) 1,6-hexamethylene diisocyanata.

100 g bifunctional oligomer was loaded in a two-neck flask provided with a drying tube, and 5.05 g 1,6-hexamethylene diisocyanate was added dropwise under stirring at 110° C. The reaction was completed after 6 hours and the product was dissolved in chloroform, precipitated with cyclohexane, and then filtrated off and dried. A linear polyester urethane was obtained, for example with the components 3-hydroxybutyric acid/ε-caprolactone/di-anhydro-D-glucite/hexamethylene diisocyanate of the following formula:

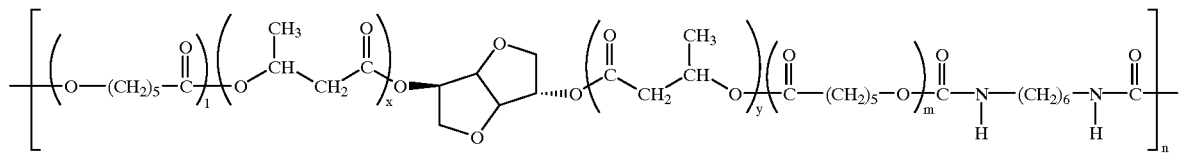

whereby n is the number of units per molecule.

Example 2

Preparation of a Crosslinked Polyester Urethane as Defined by the Invention.

The biologically degradable, crosslinked polyester urethanes, for example with the components 3-hydroxybutyric acid/ε-caprolactone/dianhydro-D-glucite/hexamethylene diisocyanate, which are representative of all other crosslinked polyester urethanes as defined by the invention, were produced according to the following general reaction pattern:

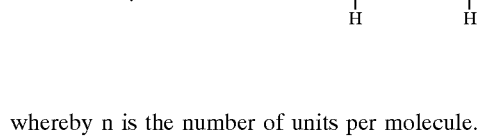

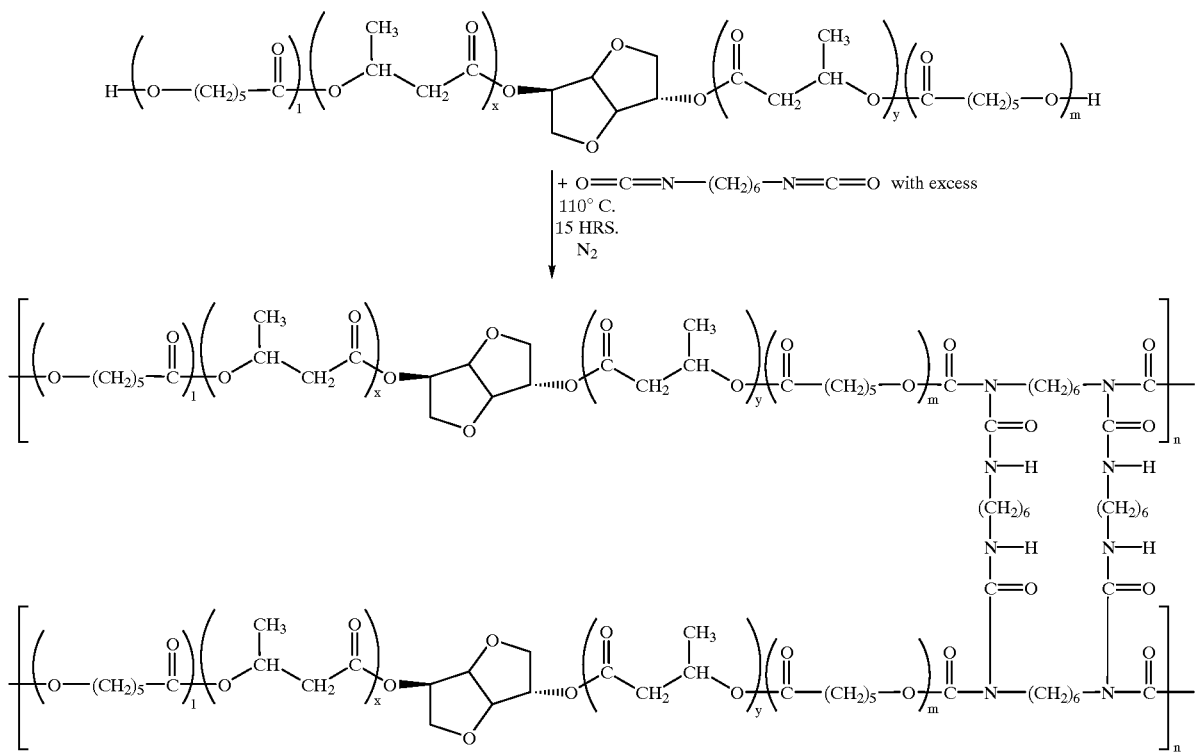

whereby n is the number of units per molecule. The preparation was carried out in this example as follows:

2.1 General instructions for preparing a crosslinked polyester urethane as defined by the invention.

Batch preparation: 10 g (2.7 mmol) bifunctional oligomer; 1.2g (7.1 mmol) 1,6-hexamethylene diisocyanate in 3 ml chloroform (with amylene stabilizer).

10 g bifunctional oligomer and 1.2 g 1,6-hexamethylene diisocyanate was dissolved in a small amount of chloroform (3 ml.) and boiled for 8 hours under protective gas (nitrogen) under reflux in a reactor with reflux cooler and drying tube. The chloroform was subsequently distilled off and the residue was heated for another 5 hours at 120° C. without stirring. The product was a transparent, rubber-like elastomer.

The general working instructions in the preceding examples are understood to be universally applicable for the preparation of all claimed compounds as defined by the invention; compounds not described explicitly herein are familiar to the expert in the field within the framework of the disclosure.

2.2. Spectroscopic Data

Figure 5:
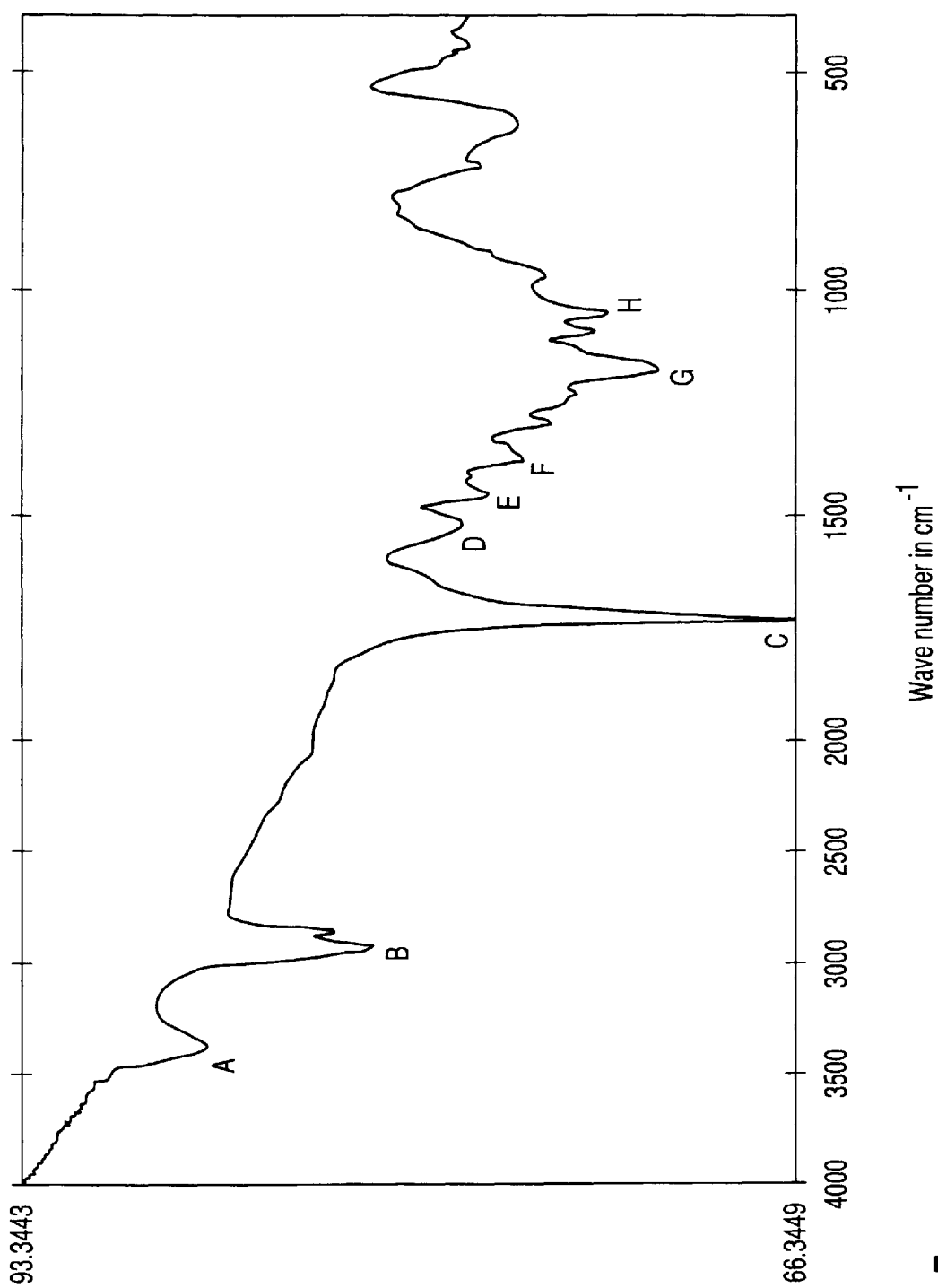
FIG. 5 shows the IR-spectrum of a polyester urethane crosslinked as defined by the invention.

An IR-film spectrum of a crosslinked polyester urethane as defined by the invention is shown by way of example in FIG. 5. Said product is a crosslinked polyester urethane consisting of the components 3-hydroxybutyric acid/ε-caprolactone/dianhydro-D-glucite, crosslinked with 1,6-hexamethylene diisocyanate.

The following oscillations were measured:

IR-measurement (film); the oscillations A to H shown in FIG. 5, which represents said oscillations, are designed as follows:

| A | 3300 cm$^{-1}$ | N—H valency oscillation |
| B | 3000 cm$^{-1}$ | C—H valency oscillation; |
| C | 1730 cm$^{-1}$ | C=O valency oscillation; |
| D | 1540 cm$^{-1}$ | N—H spread-deformation oscillation; |
| E | 1450 cm$^{-1}$ | CH$_2$ deformation oscillation; |
| F | 1380 cm$^{-1}$ | CH-deformation oscillation; |
| G | 1250 cm$^{-1}$ | N—CO=O valency oscillation; |
| H | 1050 cm$^{-1}$ | C—O—C valency oscillation. |

Example 3

Purification of the Linear Polyester Urethanes of the Invention.

After the polymerization reaction, the reaction product was dissolved in chloroform and precipitated in 5 to 10 times the amount of the precipitating agent (cyclohexane, diethyl ether). By repeating the precipitation it was possible to almost completely eliminate the smaller molecules and the catalyst. If the material has to satisfy higher requirements, the polyurethane can be additionally purified by chromatographic-column separation.

Example 4

Preparation of a Sheet Material.

Linear polyester urethane was dissolved in chloroform (1 g polyester urethane in about 15 ml chloroform), filtrated off, and then permitted to evaporate on a glass plate at room temperature. The resulting sheet was elastically deformable and completely transparent.

Example 5

Preparation of an Adhesive Tape.

Sticky crosslinked polymer with a low degree of crosslinking was swelled in a small amount of acetone or chloroform and applied in a thin layer to the polyester urethane sheet according to example 4, or to paper. Following evaporation of the solvent, the adhesive adheres well to the sheet or paper just like known adhesive tapes.

Example 6

Preparation of Polymer Blends.

A solution of 1 g linear polyester urethane, prepared according to example 1, and 9 g bacterially produced poly-3-hydroxy butyrate was prepared in 150 ml chloroform. The filtered solution was applied to a glass plate. The solvent was evaporated at room temperature. The resulting product was a weakly beige-colored, largely transparent, elastically deformable sheet.

Example 7

Preparation of a Composite Material.

A solution of 10 g linear polyester urethane, prepared according to example 1, in 150 ml chloroform, was intimately mixed with 100 g cellulose powder. The suspension was poured into a mold and the solvent was evaporated at room temperature. The product obtained was a weakly beige-colored, hard and tough molded part.

What is claimed is:

1. A biodegradable linear polyester urethane, wherein the linear polyester urethane consist of units of the general formula (I):

(I)

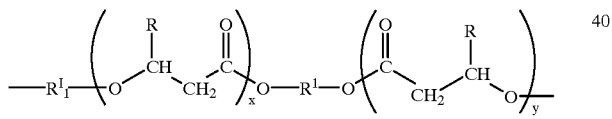

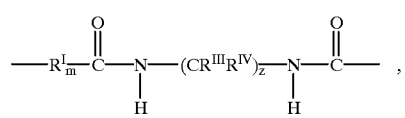

whereby R is an unsubstituted or substituted, saturated or unsaturated $(C_1–C_{10})$-hydrocarbon group, and the substituents are selected from group A consisting of halogen, pseudo-halogen, $(C_1–C_{10})$-alkyl, $(C_1–C_{10})$-alkoxy, allyl, vinyl, benzyl, unsubstituted, or substituted aryl, alkenyl, alkinyl, amide, $(C_1–C_6)$-dialkylamino, unsubstituted or substituted $(C_3–C_8)$-cycloalkyl; and that the aryl or cycloalkyl substituents are selected from the group consisting of halogen, pseudo-halogen, $(C_1–C_{10})$-alkyl, $(C_1–C_{10})$-alkoxy, amide, $(C_1–C_6)$-dialkylamino, alkenyl, alkinyl, allyl, and vinyl; and whereby $R^I$ is selected from the group consisting of:

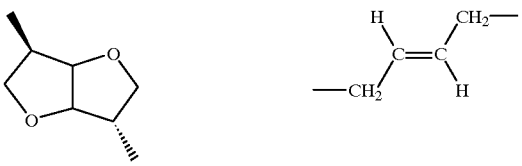

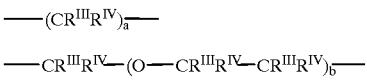

with a=2 to 12, and b=1 to 3000;

$R^{II}$ is a ring-opening product of a compound selected from the group consisting of b-propiolactone, γ-butyrolactone, δ-valerolactone, ε-caprolactone, and N-protected D, L-serine-lactone, which compound may be substituted with a substituent from group A;

$R^{III}$ and $R^{IV}$ are independently of each other identical or different and selected from the group consisting of H, —OR, whereby R is as defined above, halogen, pseudo-halogen, benzyl, allyl, vinyl, unsubstituted or substituted aryl, $(C_1–C_{10})$-alkyl, alkenyl, alkinyl, amide, $(C_1–C_6)$-dialkylamino, unsubstituted or substituted $(C_3–C_8)$-cycloalkyl, with at least one heteroatom, unsubstituted or substituted five-, six- or seven-link aromatic compound, or hetero aromatics with at least one hetero-atom, whereby the hetero-atom is O, S or N; and the substituents are taken from group A;

whereby $0 \leq x+y \leq 60$, and $2 \leq l+m \leq 60$, and z=1 to 25.

2. The biodegradable polyester urethane according to claim 1, wherein the degree of crosslinking determines the properties of the polyester urethane.

3. The biodegradable polyester urethane according to claim 1, wherein $0 \leq x+y \leq 30$, $2 \leq l+m \leq 30$, and z=6 to 10.

4. The biodegradable polyester urethane according to claim 1, wherein the polyester urethane is transparent and flexibly deformable.

5. The biodegradable polyester urethane according to claim 1, wherein the linear polyester urethane has thermoplastic properties.

6. Biodegradable crosslinked polyester urethanes, wherein said polyester urethanes ensue from the linear polyester urethanes with units of formula (I) in that they are crosslinked by diisocyanate bridges and contain fragments of the general formula (II):

(II)

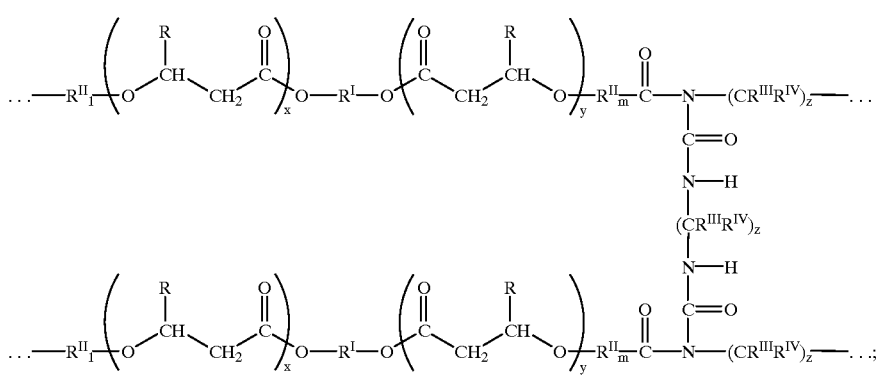

whereby R, $R^I$, $R^{II}$, $R^{III}$, $R^{IV}$, and x, y, z, l, and m are defined as in claim 1.

7. Polymer blends comprising at least two biodegradable polyester urethanes selected from the group consisting of linear polyester urethanes, cross-linked polyester urethanes and mixtures thereof according to claim 1.

8. The polymer blends according to claim 7, further containing at least one additional biodegradable polymer.

9. The polymer blends according to claim 8, wherein the biodegradable polymer is at least one bacterially produced poly-3-hydroxyalkanoates.

10. The polymer blends according to claim 7, wherein the polymer blends are present as composite materials, in mixture with a substance selected from the group consisting of starch powder, cellulose powder and additional biodegradable compound materials.

11. A composition comprising the polymer blends according to claim 7, as coating materials for paper, starch, sheets, films, laminates, molded articles, containers, packaging materials for foodstuffs, bags, covers, coating materials in the field of galenic pharmacy in the form of tablets, capsules, suppositories, medical implants; adhesives, and adhesive tapes.

12. A method of producing a biodegradable polyester urethane comprising the following steps:

(i) reacting a bromine-acetic acid alkyl ester with an aldehyde of the general formula:

wherein R is an unsubstituted or substituted, saturated or unsaturated ($C_1$–$C_{10}$)-hydrocarbon group; and the substituents are selected from the group A consisting of halogen, pseudo-halogen, ($C_1$–$C_{10}$)-alkyl, ($C_1$–$C_{10}$)-alkoxy, allyl, vinyl, benzyl, unsubstituted or substituted aryl, alkenyl, alkinyl, amide, ($C_1$–$C_6$)-dialkylamino, unsubstituted or substituted ($C_3$–$C_8$)-cycloalkyl; and the aryl or cycloalkyl substituents are selected from the crout consisting of halogen, pseudo-halogen, ($C_1$–$C_{10}$)-alkyl, ($C_1$–$C_{10}$)-alkoxy, amide, ($C_1$–$C_6$)-dialkylamino, alkenyl, alkinyl, allyl, and vinyl;

with a zinc/copper catalyst in an anhydrous organic solvent;

(ii) reacting a resulting 3-hydroxycarbonic acid derivative with a diol or protected polyol of the general formula (B):

HO—R'—OH  (B)

wherein $R^I$ is selected from the group consisting of

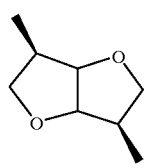
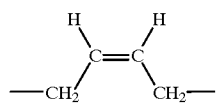

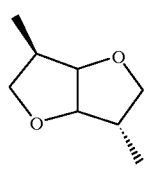
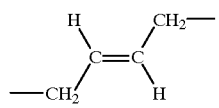

with a=2 to 12, and b=1 to 3000, whereby $R^{III}$ and $R^{IV}$ are as defined below;

at about 80° to 130° C. for approximately 8 to 15 hours in the presence of a tin complex catalyst under protective gas, to an oligo-diol of the general formula (C):

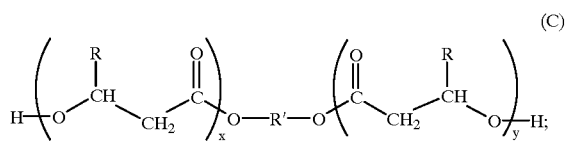

whereby R and $R^I$ are as defined above;

and 0≦x+y≦60; and the oligo-diol of the general formula (C) represents the starting product for x+y=0;

(iii) reacting the oligo-diol of the general formula (C) with a compound selected from the group consisting of:

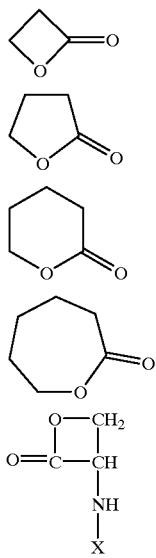

whereby X represents any desired protective group, and the compound may be substituted, with substitutes from the group A defined above;

in the presence of a tin complex catalyst at about 80 to 130° C., for approximately 4 to 6 hours and under protective gas, to a macro-diol of the general formula (D);

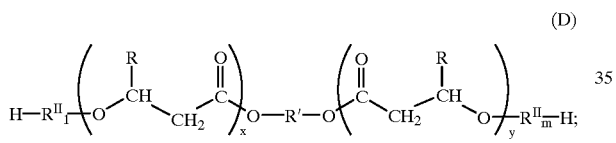

whereby R, R$^I$ are as defined above, and $0 \leq x+y \leq 60$, and $2 \leq l+m \leq 60$; and R$^{II}$ is a ring-opening product of a compound selected from the group consisting of b-propiolactone, γ-butyrolactone, δ-valerolactone, ε-caprolactone, and N-protected D, L-serine-lactone, which compound may be substituted with a substituent from group A;

R$^{III}$ and R$^{IV}$ are independently of each other identical or different and selected from the group consisting of H, —OR, whereby R is as defined above, halogen, pseudo-halogen, benzyl, allyl, vinyl, unsubstituted or substituted aryl, (C$_1$–C$_{10}$)-alkyl, alkenyl, alkinyl, amide, (C$_1$–C$_6$)-dialkylamino, unsubstituted or substituted (C$_3$–C$_8$)-cycloalkyl, with at least one hetero-atom, unsubstituted or substituted five-, six- or seven-link aromatic compound, or hetero aromatics with at least one hetero-atom, whereby the hetero-atom is O, S or N; and the substituents are taken from group A; and (iv) reacting the macro-diol of the general formula (D) with at least one compound containing at least two free isocyanate groups; at about 110 to 140° C. for approximately 6 to 15 hours and under protective gas, to a polyester urethane.

13. The method according to claim 12, wherein equimolar amounts of at least one compound having two free isocyanate groups are used in step (iv), so that a linear polyester urethane is consequently formed.

14. The method according to claim 12, wherein an excess of at least one compound having at least two free isocyanate groups is used in step (iv), so that a crosslinked polyester urethane is consequently formed.

15. The method according to claim 12 wherein the tin complex catalyst of steps (ii) and (iii) is selected from the group consisting of dibutyl tin oxide, dibutyl tin dilaurate, and a compound with the following chemical formula (E) wherein R$_3$ is —(Ch$_2$)$_k$— with k=1 to 6, and R$_2$ and R$_1$ are:

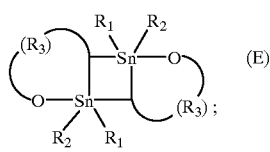

wherein R$_3$ is —(CH$_2$)$_k$— with k=1 to 6, and R$_2$ and R$_3$ are independently of one another identical or different, and selected from unsubstituted or substituted aryl, whereby the substituents are taken from the group A defined above.

16. The method according to claim 15, wherein the tin complex catalyst of steps (ii) and (iii) is the dimer of 2,2-Di-n-butyl-1,3,2-dioxastannolane with the following formula (F):

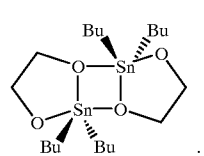

\* \* \* \* \*